(12) United States Patent
Kruger

(10) Patent No.: US 8,388,817 B2
(45) Date of Patent: Mar. 5, 2013

(54) METHOD AND APPARATUS FOR TREATING A FLUID

(76) Inventor: Eric John Kruger, Erie, PA (US)

( * ) Notice: Subject to any disclaimer, the term of this patent is extended or adjusted under 35 U.S.C. 154(b) by 16 days.

(21) Appl. No.: 12/672,573

(22) PCT Filed: Aug. 11, 2008

(86) PCT No.: PCT/US2008/009621
§ 371 (c)(1),
(2), (4) Date: May 21, 2010

(87) PCT Pub. No.: WO2009/023187
PCT Pub. Date: Feb. 19, 2009

(65) Prior Publication Data
US 2011/0042221 A1 Feb. 24, 2011

Related U.S. Application Data

(63) Continuation-in-part of application No. 11/837,225, filed on Aug. 10, 2007, now Pat. No. 8,187,444.

(60) Provisional application No. 60/955,253, filed on Aug. 10, 2007.

(51) Int. Cl.
C02F 1/461 (2006.01)
C02F 1/46 (2006.01)
C02F 1/467 (2006.01)
B01D 35/06 (2006.01)

(52) U.S. Cl. .................. 204/228.6; 210/746; 422/82.02

(58) Field of Classification Search .................. 204/555, 204/228.6, 229.5, 230.6; 205/789.5; 210/746; 210/739; 422/82.02
See application file for complete search history.

(56) References Cited

U.S. PATENT DOCUMENTS

| | | | |
|---|---|---|---|
| 2,098,431 A | 11/1937 | Patridge et al. | |
| 2,539,305 A | 1/1951 | Hatch | |
| 2,640,026 A | 5/1953 | Whittington | |
| 3,177,899 A | 4/1965 | Anderson et al. | |
| 3,469,696 A | 9/1969 | Petrucci et al. | |
| 3,679,565 A | 7/1972 | Gilchrist | |
| 3,692,179 A | 9/1972 | Moore | |
| 3,794,169 A | 2/1974 | Sisk et al. | |
| 3,805,880 A | 4/1974 | Lawlar | |
| 3,843,507 A | 10/1974 | Kwan | |
| 3,891,394 A | 6/1975 | Smith et al. | |
| 3,923,629 A | 12/1975 | Shaffer | |
| 3,933,606 A | 1/1976 | Harms | |
| 3,936,376 A | 2/1976 | Centineo | |
| 3,951,807 A | 4/1976 | Sanderson | |
| 3,974,071 A | 8/1976 | Dunn et al. | |
| 3,990,968 A | 11/1976 | Oesterle | |
| 3,992,301 A | 11/1976 | Shippey et al. | |
| 4,050,426 A | 9/1977 | Sanderson | |

(Continued)

FOREIGN PATENT DOCUMENTS

| | | |
|---|---|---|
| DE | 4229740 | 10/1994 |
| DE | 196 02 369 A1 | 7/1997 |

(Continued)

OTHER PUBLICATIONS

Various press releases from Global Water Technologies, Inc. on their website www.gwtr.com/news (dated from Jan. 18, 1999 through May 17, 2007).

(Continued)

*Primary Examiner* — J. Christopher Ball
(74) *Attorney, Agent, or Firm* — Faegre Baker Daniels

(57) ABSTRACT

Fluid treatment devices are disclosed. The fluid treatment devices may include a first electrode and a second electrode and a control device which provides an alternating potential difference between the first electrode and the second electrode.

17 Claims, 20 Drawing Sheets

U.S. PATENT DOCUMENTS

| | | | |
|---|---|---|---|
| 4,153,559 | A | 5/1979 | Sanderson |
| 4,188,278 | A | 2/1980 | Reis et al. |
| 4,216,092 | A | 8/1980 | Shalhoob et al. |
| 4,235,698 | A | 11/1980 | Arnaud |
| 4,299,700 | A | 11/1981 | Sanderson |
| 4,320,003 | A | 3/1982 | Sanderson et al. |
| 4,326,954 | A | 4/1982 | Shroyer |
| 4,357,237 | A | 11/1982 | Sanderson |
| 4,419,240 | A | 12/1983 | Rosaen |
| 4,430,785 | A | 2/1984 | Sanderson |
| 4,455,229 | A | 6/1984 | Sanderson et al. |
| 4,460,008 | A | 7/1984 | O'Leary et al. |
| 4,496,459 | A | 1/1985 | Rosaen |
| 4,574,047 | A | 3/1986 | Rosaen |
| 4,629,568 | A | 12/1986 | Ellis, III |
| 4,648,043 | A | 3/1987 | O'Leary et al. |
| 4,651,570 | A | 3/1987 | Rosaen |
| 4,701,259 | A | 10/1987 | Rosaen |
| 4,784,771 | A | 11/1988 | Wathen et al. |
| 4,789,448 | A | 12/1988 | Woodhouse |
| 4,820,422 | A | 4/1989 | Spencer |
| 4,861,489 | A | 8/1989 | Swift et al. |
| 4,865,748 | A | 9/1989 | Morse |
| 4,889,041 | A | 12/1989 | Mahlich et al. |
| 4,931,187 | A | 6/1990 | Derham et al. |
| 4,963,268 | A | 10/1990 | Morse |
| 4,966,697 | A | 10/1990 | Rosaen |
| 4,970,004 | A | 11/1990 | Rosaen |
| 4,981,594 | A | 1/1991 | Jones |
| 5,007,994 | A | 4/1991 | Snee |
| 5,043,063 | A | 8/1991 | Latimer |
| 5,106,491 | A | 4/1992 | Schulze et al. |
| 5,128,032 | A | 7/1992 | Rosaen |
| 5,145,585 | A | 9/1992 | Coke |
| 5,176,826 | A | 1/1993 | Rosaen |
| 5,188,738 | A | 2/1993 | Kaali et al. |
| 5,204,006 | A | 4/1993 | Santoli |
| 5,282,972 | A | 2/1994 | Hanna et al. |
| 5,304,302 | A | 4/1994 | Bossert |
| 5,314,623 | A | 5/1994 | Heskett |
| 5,324,398 | A | 6/1994 | Erickson et al. |
| 5,326,446 | A | 7/1994 | Binger |
| 5,354,515 | A | 10/1994 | Ushimaru |
| 5,423,962 | A | 6/1995 | Herbst |
| 5,427,667 | A | 6/1995 | Bakhir et al. |
| 5,433,856 | A | 7/1995 | Heskett |
| 5,458,758 | A | 10/1995 | Suchacz |
| 5,462,678 | A | 10/1995 | Rosaen |
| 5,480,564 | A | 1/1996 | Pope et al. |
| 5,520,816 | A | 5/1996 | Kuepper |
| 5,549,812 | A | 8/1996 | Witt a.k.a. Witte |
| 5,611,907 | A | 3/1997 | Herbst et al. |
| 5,643,444 | A | 7/1997 | Garrigues et al. |
| 5,670,041 | A | 9/1997 | Cho et al. |
| 5,710,536 | A | 1/1998 | Fastman |
| 5,725,778 | A | 3/1998 | Cho et al. |
| 5,776,334 | A | 7/1998 | Cho |
| 5,837,134 | A | 11/1998 | Heskett |
| 5,846,414 | A | 12/1998 | Cho |
| 5,882,530 | A | 3/1999 | Chase |
| 5,891,334 | A | 4/1999 | Gundrum et al. |
| 5,916,490 | A | 6/1999 | Cho |
| 5,951,856 | A | 9/1999 | Cho |
| 5,990,684 | A | 11/1999 | Merrill |
| 6,113,779 | A | 9/2000 | Snee |
| 6,120,688 | A | 9/2000 | Daly et al. |
| 6,203,710 | B1 | 3/2001 | Woodbridge |
| 6,217,773 | B1 | 4/2001 | Graham |
| 6,232,783 | B1 | 5/2001 | Merrill |
| 6,238,546 | B1 | 5/2001 | Knieper et al. |
| 6,258,250 | B1 | 7/2001 | Weissenbacher et al. |
| 6,270,664 | B1 | 8/2001 | Tsabari |
| 6,292,085 | B1 | 9/2001 | Cho |
| 6,295,411 | B1 | 9/2001 | Fastman |
| 6,325,942 | B1 | 12/2001 | Freije, III |
| 6,346,180 | B1 | 2/2002 | Gonzalez et al. |
| 6,365,023 | B1 | 4/2002 | De Los Reyes et al. |
| 6,379,518 | B1 | 4/2002 | Osawa et al. |
| 6,383,391 | B1 | 5/2002 | Ehrenberg et al. |
| 6,398,928 | B1 | 6/2002 | Koganezawa et al. |
| 6,402,920 | B1 | 6/2002 | Sato et al. |
| 6,413,298 | B1 | 7/2002 | Wnek et al. |
| 6,416,668 | B1 | 7/2002 | Al-Samadi |
| 6,553,894 | B1 | 4/2003 | Hamon et al. |
| 6,558,537 | B1 | 5/2003 | Herrington et al. |
| 6,609,070 | B1 | 8/2003 | Lueck |
| 6,609,564 | B2 | 8/2003 | Imaoka et al. |
| 6,613,233 | B1 | 9/2003 | Rusk et al. |
| 6,641,727 | B1 | 11/2003 | Aldred et al. |
| 6,652,758 | B2 | 11/2003 | Krulik |
| 6,689,270 | B1 | 2/2004 | Evert |
| 6,709,599 | B1 | 3/2004 | Rosenberger et al. |
| 6,733,654 | B1 | 5/2004 | Itzhak |
| 6,773,588 | B2 | 8/2004 | Beeman et al. |
| 6,821,428 | B1 | 11/2004 | Zeiher et al. |
| 6,838,001 | B2 | 1/2005 | Zeiher et al. |
| 6,849,178 | B2 | 2/2005 | Hecking |
| 6,855,233 | B2 | 2/2005 | Sawada |
| 6,855,257 | B2 | 2/2005 | Bonds et al. |
| 6,863,822 | B2 | 3/2005 | Pipes |
| 7,015,119 | B2 | 3/2006 | Takahashi et al. |
| 7,045,063 | B2 | 5/2006 | Zhang et al. |
| 7,052,600 | B2 | 5/2006 | McKay |
| 7,077,962 | B2 | 7/2006 | Pipes |
| 7,083,730 | B2 | 8/2006 | Davis |
| 7,144,513 | B2 | 12/2006 | Sher et al. |
| 7,229,555 | B1 | 6/2007 | Edinger |
| 7,244,360 | B2 | 7/2007 | Cho |
| 7,377,291 | B2 | 5/2008 | Moon et al. |
| 7,497,953 | B2 | 3/2009 | Dart et al. |
| 2003/0041608 | A1 | 3/2003 | Gonzalez-Cruz et al. |
| 2003/0127398 | A1 | 7/2003 | Bartl et al. |
| 2004/0031697 | A1 | 2/2004 | Breault |
| 2004/0206680 | A1 | 10/2004 | Johnson |
| 2004/0238453 | A1 | 12/2004 | Cho |
| 2004/0254682 | A1 | 12/2004 | Kast |
| 2005/0173242 | A1 | 8/2005 | Elgressy |
| 2005/0183964 | A1 | 8/2005 | Roberts et al. |
| 2005/0242036 | A1 | 11/2005 | Harris |
| 2005/0252864 | A1 | 11/2005 | Keller et al. |
| 2005/0263386 | A9 | 12/2005 | Pitts, Jr. et al. |
| 2005/0263457 | A1 | 12/2005 | Wilkins et al. |
| 2006/0137996 | A1 | 6/2006 | Mierswa |
| 2006/0138031 | A1 | 6/2006 | Kloos et al. |
| 2006/0144700 | A1 | 7/2006 | Carson et al. |
| 2006/0175200 | A1 | 8/2006 | Holland |
| 2007/0227980 | A1 | 10/2007 | Cho |
| 2008/0029252 | A1 | 2/2008 | Freije et al. |
| 2008/0105621 | A1 | 5/2008 | Johnson et al. |
| 2009/0038944 | A1 | 2/2009 | Kruger |

FOREIGN PATENT DOCUMENTS

| | | |
|---|---|---|
| EP | 0 338 896 A1 | 4/1989 |
| EP | 1558527 | 5/2007 |
| EP | 2039656 | 3/2009 |
| GB | 2291365 | 1/1996 |
| WO | WO 98/31636 | 7/1998 |
| WO | WO 03/040043 | 5/2003 |
| WO | WO 2004/041728 | 5/2004 |
| WO | WO 2006/039873 | 4/2006 |
| WO | WO 2008/016934 | 2/2008 |
| WO | WO 2009/023186 A2 | 2/2009 |
| WO | WO 2009-023187 A2 | 2/2009 |

OTHER PUBLICATIONS

International Search Report and the Written Opinion of the International Searching Authority for PCT/US2008/009620, 12 pages.
International Search Report and the Written Opinion of the International Searching Authority for PCT/US2008/009621, 9 pages.
International Search Report and the Written Opinion of the International Searching Authority for PCT/US2008/071336, 10 pages.
"Welcome to Dime Water, Inc." press release, Aug. 2008, also available at http://www.dimewater.com/index.html, 3 pages.

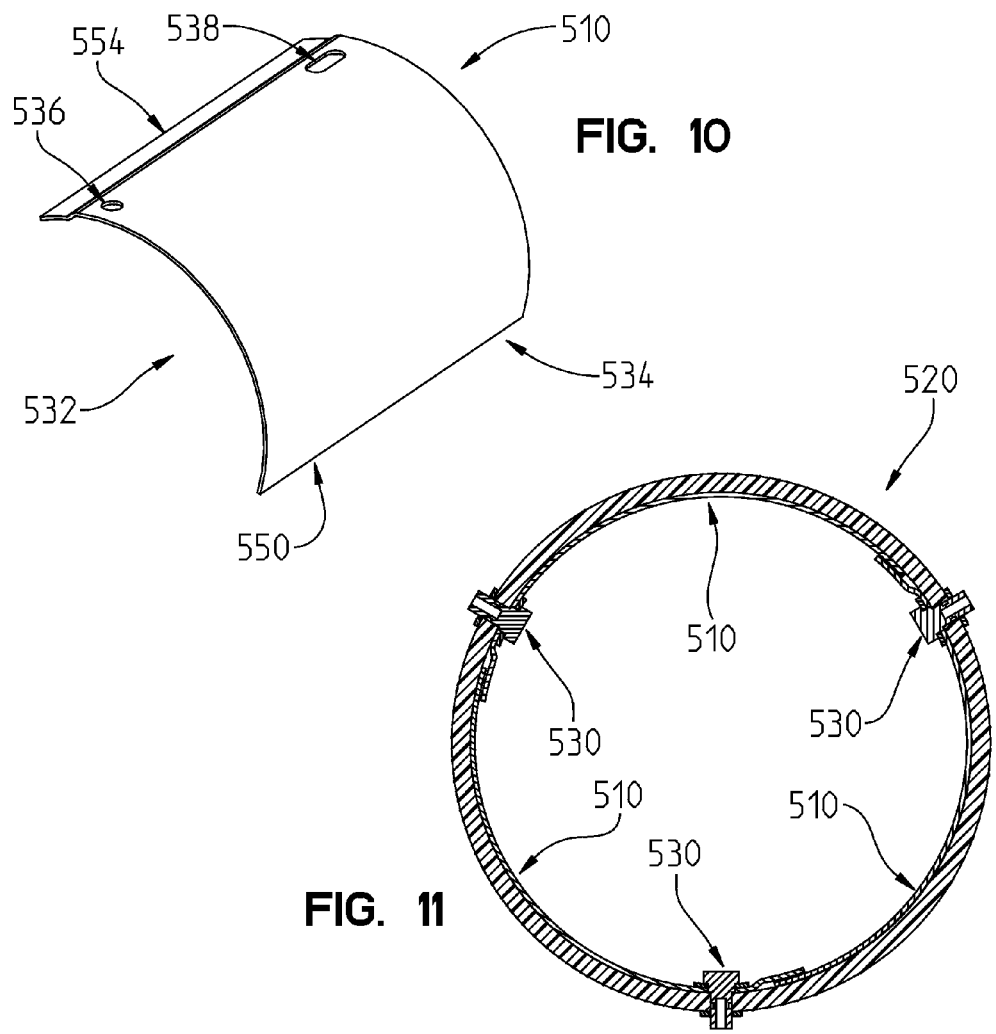
FIG. 10
FIG. 11
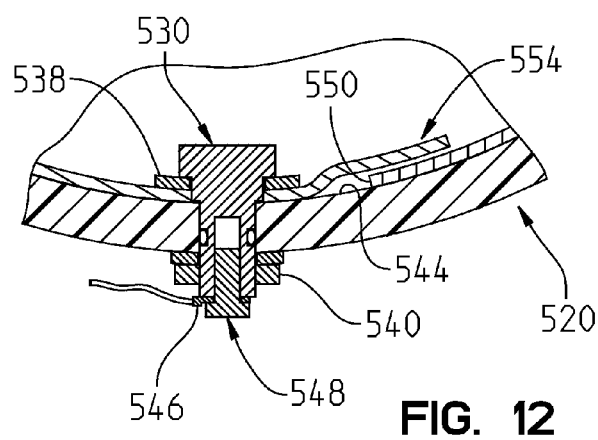
FIG. 12

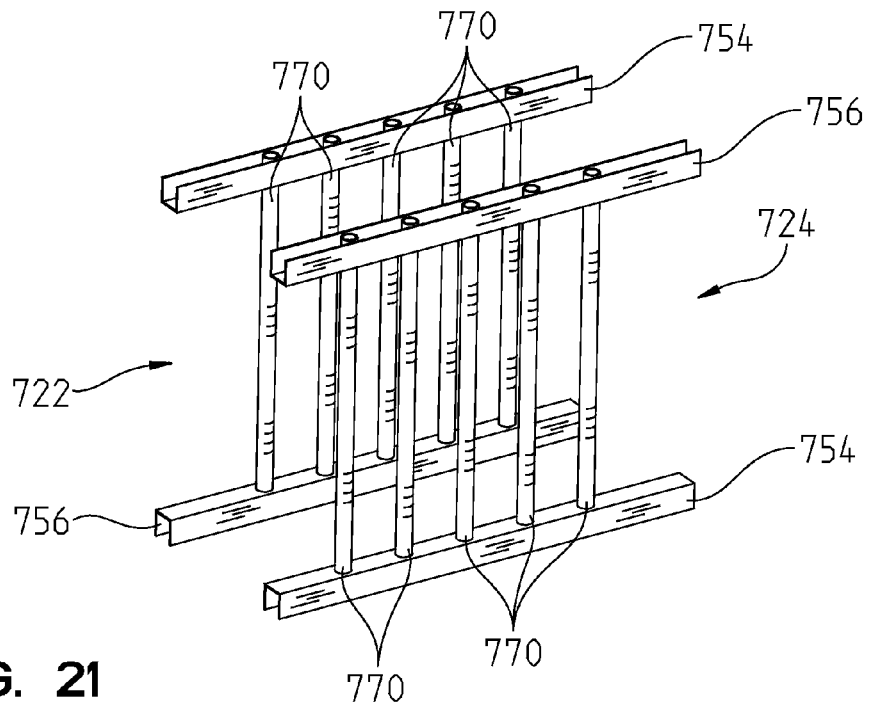
FIG. 21
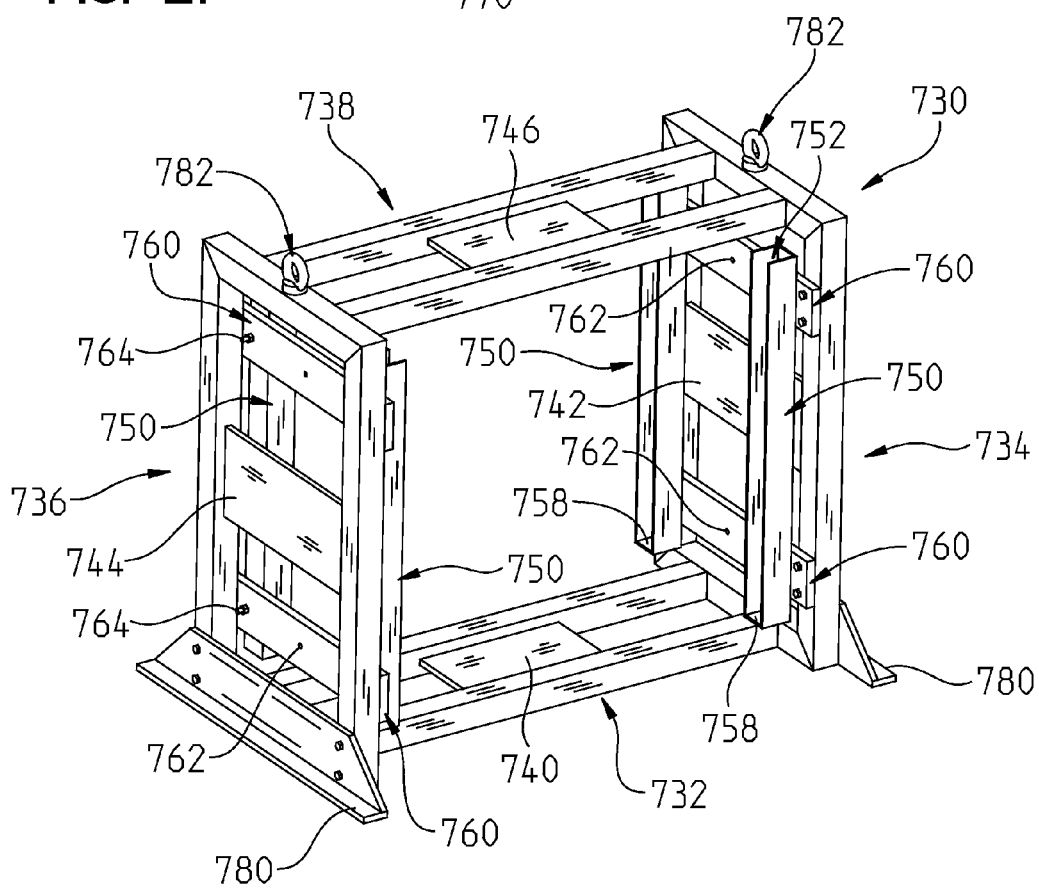

METHOD AND APPARATUS FOR TREATING A FLUID

CROSS REFERENCE TO RELATED APPLICATIONS

This application is a national stage application of PCT Application No. PCT/US2008/009621 which claims priority to U.S. patent application Ser. No. 11/837,225 and which claims the benefit of U.S. Provisional Patent Application Ser. No. 60/955,253, the disclosures of which are expressly incorporated by reference herein.

U.S. Provisional Patent Application Ser. No. 60/955,244, filed Aug. 10, 2007, titled "METHOD AND APPARATUS FOR TREATING A FLUID", is also expressly incorporated by reference herein.

BACKGROUND AND SUMMARY OF THE INVENTION

The present disclosure relates to fluid treatment devices and in particular to electrical fluid treatment devices.

It is known to reduce scale in a water based fluid by wrapping a pipe transporting the water based fluid with a wire having an alternating current passing there through. An exemplary system is the EasyWater™ brand water treatment system available from Freije Treatment Systems located at 4202 N. Awning Court, Greenfield, Ind. 46140. Further, it is known to place electrodes in direct contact with a water based fluid as disclosed in U.S. patent application Ser. No. 10/493,094, assigned to Drexel University, the disclosure of which is expressly incorporated by reference herein.

In an exemplary embodiment of the present disclosure, a fluid treatment device for treating a fluid passing from a first location to a second location is provided. The fluid treatment device comprising a first electrode positioned between the first location and the second location, a second electrode positioned between the first location and the second location, and a control device coupled to the first electrode and the second electrode to provide an alternating potential difference between the first electrode and the second electrode. The first electrode having a plurality of opening there through to permit the fluid to pass from a first side of the first electrode to a second side of the first electrode. The second electrode having a plurality of opening there through to permit the fluid to pass from a first side of the second electrode to a second side of the second electrode. In one example, the fluid as it travels from the first location to the second location passes from the first side of the first electrode through the plurality of openings in the first electrode to a region between the first electrode and the second electrode and through the plurality of openings in the second electrode to the second side of the second electrode. In a variation thereof, the first electrode and the second electrode are screens. In another example, the fluid treatment device further comprising a third electrode positioned proximate the second side of the second electrode. The third electrode having a plurality of openings there through to permit the fluid to pass from a first side of the third electrode to a second side of the third electrode and the third electrode being electrically coupled to the first electrode. In another example, fluid treatment device further including a cover is coupled to the first electrode. The second location being an opening to an intake pipe. The cover keeping debris spaced apart from the intake pipe. In a further example, the first electrode includes a plurality of louvers and the second electrode includes a plurality of louvers. In a variation thereof, the plurality of louvers of the first electrode are generally vertically spaced apart and the plurality of louvers of the second electrode are generally spaced apart. A first louver of the plurality of louvers of the first electrode being positioned between a pair of louvers of the plurality of louvers of the second electrode. In still another example, the fluid treatment device further comprises a frame having a first holder which receives the first electrode and a second holder which receives the second electrode. The first holder and the second holder keeping the first electrode and the second electrode spaced apart. In a variation thereof, the first electrode and the second electrode each include a plurality of spaced apart tubular members. A first tubular member of the first electrode being offset relative to the second electrode such that the first tubular member of the first electrode is positioned generally between a pair of tubular members of the second electrode.

In another exemplary embodiment of the present disclosure, a fluid treatment device for treating a fluid is provided. The fluid treatment device comprising a fluid conduit having an interior through which the fluid travels; at least a first electrode and a second electrode placed in direct contact with the fluid within the fluid conduit, and a control device coupled to the first electrode and the second electrode to provide an alternating potential difference between the first electrode and the second electrode, wherein the fluid passes from a first end of the elongated body to a second end of the elongated body. At least the first electrode located within the fluid conduit. The first electrode being an elongated body having a rounded first end and a rounded second end, the first electrode is supported by the fluid conduit. In an example, the elongated body of the first electrode is generally aligned with a longitudinal axis of the fluid conduit. In a variation thereof, the second electrode generally surrounds the fluid electrode. The fluid passing between the first electrode and the second electrode. In a further variation thereof, the second electrode is a first section of the fluid conduit. In yet a further variation, the first electrode is supported by a second section of the fluid conduit. In still a further variation, the second section of the fluid conduit is insulated from the fluid. In another variation, the first electrode is supported by the fluid conduit in a region outside of the first section of the fluid conduit. In a further variation, the first section and the second section are coupled to the control device. In still a further variation, the fluid flows in a direction generally parallel to a longitudinal extent of the first electrode.

In a further exemplary embodiment of the present disclosure, a fluid treatment device for treating a fluid is provided. The fluid treatment device comprising a fluid conduit having an interior through which the fluid travels, at least a first electrode and a second electrode placed in direct contact with the fluid within the fluid conduit, the first electrode located along the longitudinal axis of the fluid conduit; and a control unit coupled to the first electrode and the second electrode to provide an alternating potential difference between the first electrode and the second electrode. The fluid conduit including a first portion, a second portion parallel to the first portion, and a third portion parallel to the second portion. Each of the first portion, the second portion, and the third portion positioned along a longitudinal axis of the fluid conduit. The fluid traveling from the first portion to the second portion and then to the third portion. The first electrode is positioned in the second portion of the fluid conduit such that the fluid in the first portion of the fluid conduit is spaced apart from the first electrode. At least a first portion of the fluid in the second portion contacts the first electrode, and the fluid in the third portion of the fluid conduit is spaced apart from the first electrode. In an example, at least a second portion of the fluid in the second portion of the fluid conduit contacts the second electrode. In a variation thereof, at least a portion of the second portion of the fluid conduit is the second electrode. In another variation thereof, the second portion of the fluid conduit supports the second electrode.

In yet another exemplary embodiment of the present disclosure, a fluid treatment device for treating a fluid is provided. The fluid treatment device comprising a fluid conduit having an interior through which the fluid travels, the fluid conduit including a first portion and a second portion insulated from the first portion, the fluid flowing from the first portion into the second portion, wherein the first portion and the second portion act as a first electrode and a second electrode, respectively; and a control device coupled to the first portion and the second portion, the control device providing an alternating potential difference between the first electrode and the second electrode. The first portion having a first cross-sectional area and the second portion having a second cross-sectional area. The second cross-sectional area being generally equal to the first cross-sectional area.

In yet a further exemplary embodiment of the present disclosure, a fluid treatment device for treating a fluid is provided. The fluid treatment device comprising a fluid conduit having an interior through which the fluid travels, the interior of the fluid conduit having a first cross-sectional area; at least a first electrode and a second electrode placed in direct contact with the fluid within the fluid conduit, the first electrode and the second electrode arranged to provide a fluid passage having a second cross-sectional area generally equal to the first cross-sectional area; and a control device coupled to the first electrode and the second electrode to provide an alternating potential difference between the first electrode and the second electrode. At least the first electrode is supported by the fluid conduit. In an example, the first electrode includes a plurality of electrode members, each electrode member having a generally straight longitudinal extent and a curved transverse extent. In a variation thereof, a radius of the curved transverse extent of each electrode member is greater than a radius of the fluid conduit.

In another exemplary embodiment of the present disclosure, the control device monitors a conductivity between the first electrode and the second electrode, wherein at least one characteristic of the alternating potential difference is adjusted by the control device based on an indication of the conductivity between the first electrode and the second electrode. In an example thereof, the indication of the conductivity between the first electrode and the second electrode provides an indication of a conductivity of the fluid. In a variation, at least one characteristic includes a peak voltage of the alternating potential difference. In a further variation, the peak voltage of the alternating potential difference is increased in response to a reduction in the conductivity between the first electrode and the second electrode. In another variation, the peak voltage of the alternating potential difference is decreased in response to an increase in the conductivity between the first electrode and the second electrode. In another example, the at least one characteristic includes a duty cycle of the alternating potential difference. In a variation thereof, the duty cycle of the alternating potential difference is increased in response to a reduction in the conductivity between the first electrode and the second electrode. In another variation thereof, the duty cycle of the alternating potential difference is decreased in response to an increase in the conductivity between the first electrode and the second electrode. In a further example, the at least one characteristic includes a peak voltage and a duty cycle. In a variation thereof, in response to an increase in the conductivity between the first electrode and the second electrode the control device first reduces the peak voltage until a threshold peak voltage is reached and subsequently reduces the duty cycle of the alternating potential difference. In a further variation, the threshold peak voltage corresponds to a target power to be applied to the water based fluid. In still another example, a period of the alternating potential difference is adjusted by the control device to enhance resonance in the water based fluid. In a variation, the period is adjusted by varying the period through a range of periods. In a further variation, the period varies between about 1 kHz to about 9 kHz. In a further variation thereof, the period varies between about 1 kHz to about 7 kHz. In still a further variation, the period varies between about 2 kHz to about 8 kHz. In yet still a further variation, the period varies between about 3 kHz to about 9 kHz. In still another variation, the period is at least about 3 kHz.

In a further exemplary embodiment of the present disclosure, a fluid treatment device for treating a fluid is provided. The fluid treatment device comprising a housing having a fluid inlet and a fluid outlet and a fluid conduit connecting the fluid inlet and the fluid outlet; a first electrode positioned to contact the fluid within the housing; a second electrode positioned to contact the fluid within the housing; and a control device coupled to the first electrode and the second electrode to provide an alternating potential difference between the first electrode and the second electrode. The fluid passes through openings in the first electrode as the fluid travels from the fluid inlet to the fluid outlet and the fluid passes through openings in the second electrode as the fluid travels from the fluid inlet to the fluid outlet. In an example, the fluid treatment device further comprises a filter housing having a first portion with a fluid inlet and a fluid outlet and a second portion threadably engaged with the first portion. The first portion and the second portion cooperating to hold the housing such that the fluid inlet of the housing is in fluid communication with the fluid inlet of the filter housing and such that the fluid outlet of the housing is in fluid communication with the fluid outlet of the filter housing.

In yet another exemplary embodiment of the present disclosure, a fluid treatment device for treating a fluid is provided. The fluid treatment device comprising a housing having a fluid inlet and a fluid outlet and a fluid conduit connecting the fluid inlet and the fluid outlet; a first electrode positioned to contact the fluid within the housing; a second electrode positioned to contact the fluid within the housing; a heating element positioned within the housing, the heating element heating the fluid prior to reaching the fluid outlet; and a control device coupled to the first electrode and the second electrode to provide an alternating potential difference between the first electrode and the second electrode. The control device monitors a conductivity between the first electrode and the second electrode. In an example, at least one characteristic of the alternating potential difference is adjusted by the control device based on an indication of the conductivity between the first electrode and the second electrode. In another example, the control device is positioned within the housing.

BRIEF DESCRIPTION OF THE DRAWINGS

The detailed description of the drawings particularly refers to the accompanying figures in which:

FIG. 10 illustrates a perspective view of an electrode member of the treatment device of FIG. 9;

FIG. 11 is a transverse, sectional view of the treatment device of FIG. 9;

FIG. 12 is a detail view of a portion of the transverse, sectional view of FIG. 11;

FIG. 21 illustrates an exploded, assembly view of an electrode arrangement for an exemplary treatment device.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention. Although the disclosure describes treatment devices for use in connection with a water based fluid system, it should be understood that the treatment devices may be used in various applications and should not be limited to use in connection with a water delivery system.

Various treatment devices are disclosed herein. Each treatment device includes one or more components that function as a first electrode and one or more components that function as a second electrode. The first electrode and the second electrode of each embodiment is electrically coupled to a control unit that provides an alternating potential difference across the first electrode and the second electrode. An electrical circuit is formed of the control unit, the first electrode, the second electrode, and a fluid which is in contact with the first electrode and the second electrode. Although a single pair of electrodes are disclosed in connection with many embodiments, it is contemplated to include multiple pairs of electrodes in each embodiment.

Figure 1:
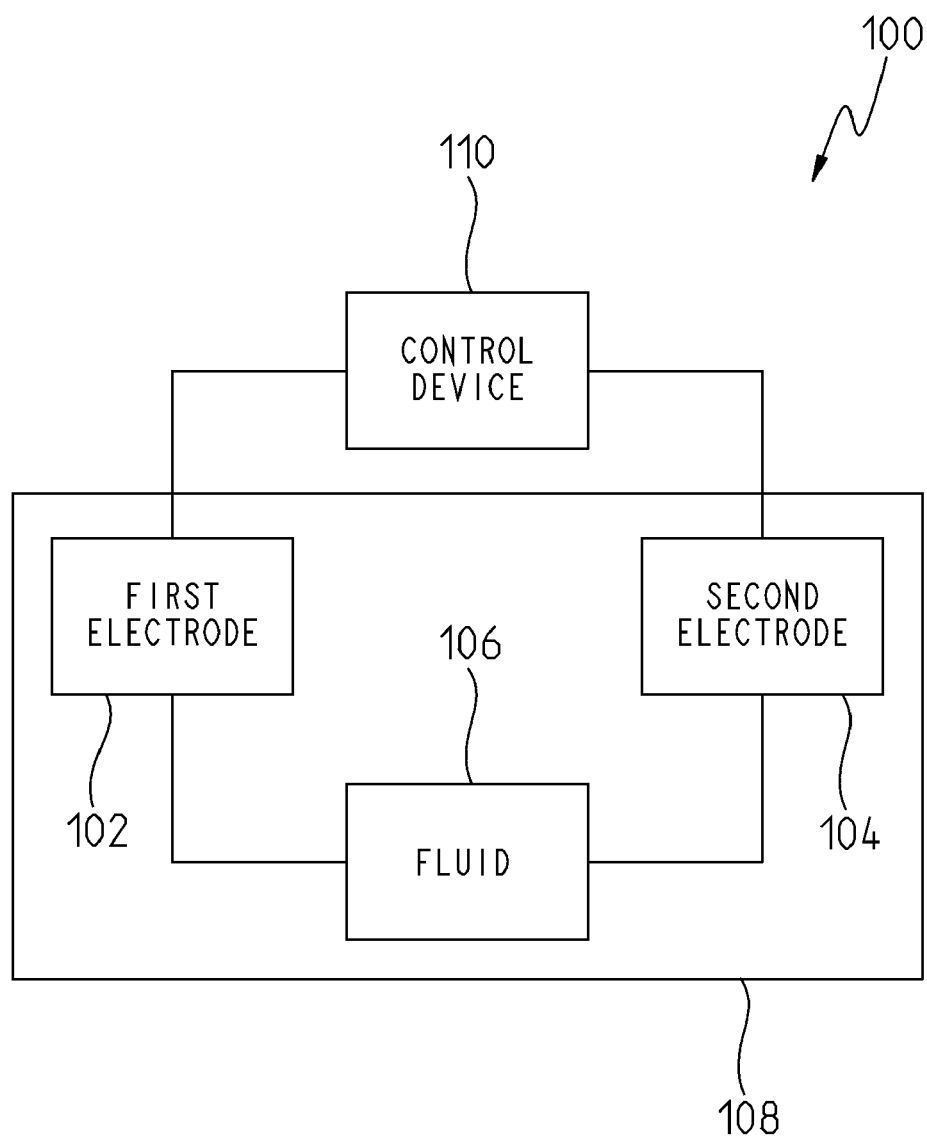
FIG. 1 is a representation of an exemplary treatment device.

Referring to FIG. 1, a representation of a treatment device 100 is shown. Treatment device 100 includes a first electrode 102 and a second electrode 104 both of which are positioned to directly contact fluid 106. Although two electrodes are shown, additional electrodes may be included. Further, one or both of first electrode 102 and second electrode 104 may include multiple electrode components which act together as a single electrode. First electrode 102, second electrode 104, and fluid 106 are associated with a conduit 108. Conduit 108 may take on various forms. Exemplary conduits include pipes, channels, reservoirs, cooling towers, heat exchanger passageways, containers, and other suitable structures which guide or hold a fluid.

Exemplary conduits may be pressurized or may be at atmospheric pressure. Further, exemplary conduits may be a part of a closed loop system having a recirculating fluid, an open loop system having a recirculating fluid, and a once through system wherein the fluid is dispensed. An exemplary once through system is a household or commercial water system, such as a hot water heater, an ice maker, a refrigerator, a coffee maker, a filtered water device, a faucet, and other suitable water delivery devices.

First electrode 102 and second electrode 104 are shown being contained within conduit 108. In one embodiment, first electrode 102 and second electrode 104 are positioned within conduit 108. In one embodiment, one or both of first electrode 102 and second electrode 104 form a portion of conduit 108.

A control unit 110 is coupled to first electrode 102 and second electrode 104 and provides a potential difference between the first electrode 102 and the second electrode 104. In one embodiment, the potential difference is an alternating potential difference. Control unit 110, first electrode 102, fluid 106, and second electrode 104 form a circuit through which a current flows. The direction of the current flow is based on the potential difference applied by control unit 110.

In one embodiment, control unit 110 monitors a conductivity between the first electrode 102 and the second electrode 104 and adjusts at least one characteristic of the potential difference between the first electrode 102 and the second electrode 104 based on the monitored conductivity between the first electrode 102 and the second electrode 104. Exemplary control units and their operation are provided in U.S. patent application Ser. No. 11/837,225, filed Aug. 10, 2007, titled "FLUID TREATMENT DEVICE", the disclosure of which is expressly incorporated by reference herein.

In one embodiment, the potential difference is an alternating potential difference. In one embodiment, control unit 110 based on a measured conductivity of the fluid alters a characteristic of the potential difference. In one embodiment, control unit 110 measures the conductivity of the fluid. Exemplary characteristics of the potential difference which are altered by control unit 110 when the potential difference is an alternating potential difference include a voltage of the potential difference, a period of the potential difference, and a duty cycle of the potential difference. In one embodiment, the at least one characteristic includes a peak voltage of the alternating potential difference. In one example, the peak voltage of the alternating potential difference is increased in response to a reduction in the conductivity between the first electrode and the second electrode. In another example, the peak voltage of the alternating potential difference is decreased in response to an increase in the conductivity between the first electrode and the second electrode. In one embodiment, the at least one characteristic includes a duty cycle of the alternating potential difference. In one example, the duty cycle of the alternating potential difference is increased in response to a reduction in the conductivity between the first electrode and the second electrode. In another example, the duty cycle of the alternating potential difference is decreased in response to an increase in the conductivity between the first electrode and the second electrode. In one embodiment, the at least one characteristic includes a peak voltage and a duty cycle. In one example, in response to an increase in the conductivity between the first electrode and the second electrode the control device first reduces the peak voltage until a threshold peak voltage is reached and subsequently reduces the duty cycle of the alternating potential difference. In one variation, the threshold peak voltage corresponds to a target power to be applied to the water based fluid. In one embodiment, a period of the alternating potential difference is adjusted by the control device to enhance resonance in the water based fluid. In one example, the period is adjusted by varying the period through a range of periods. In another example, the period varies between about 1 kHz to about 9 kHz. In a further example, the period varies between about 1 kHz to about 7 kHz. In a further example, the period varies between about 2 kHz to about 8 kHz. In yet another example, the period varies between about 3 kHz to about 9 kHz. In yet a further example, the period is at least about 3 kHz.

Figure 2:
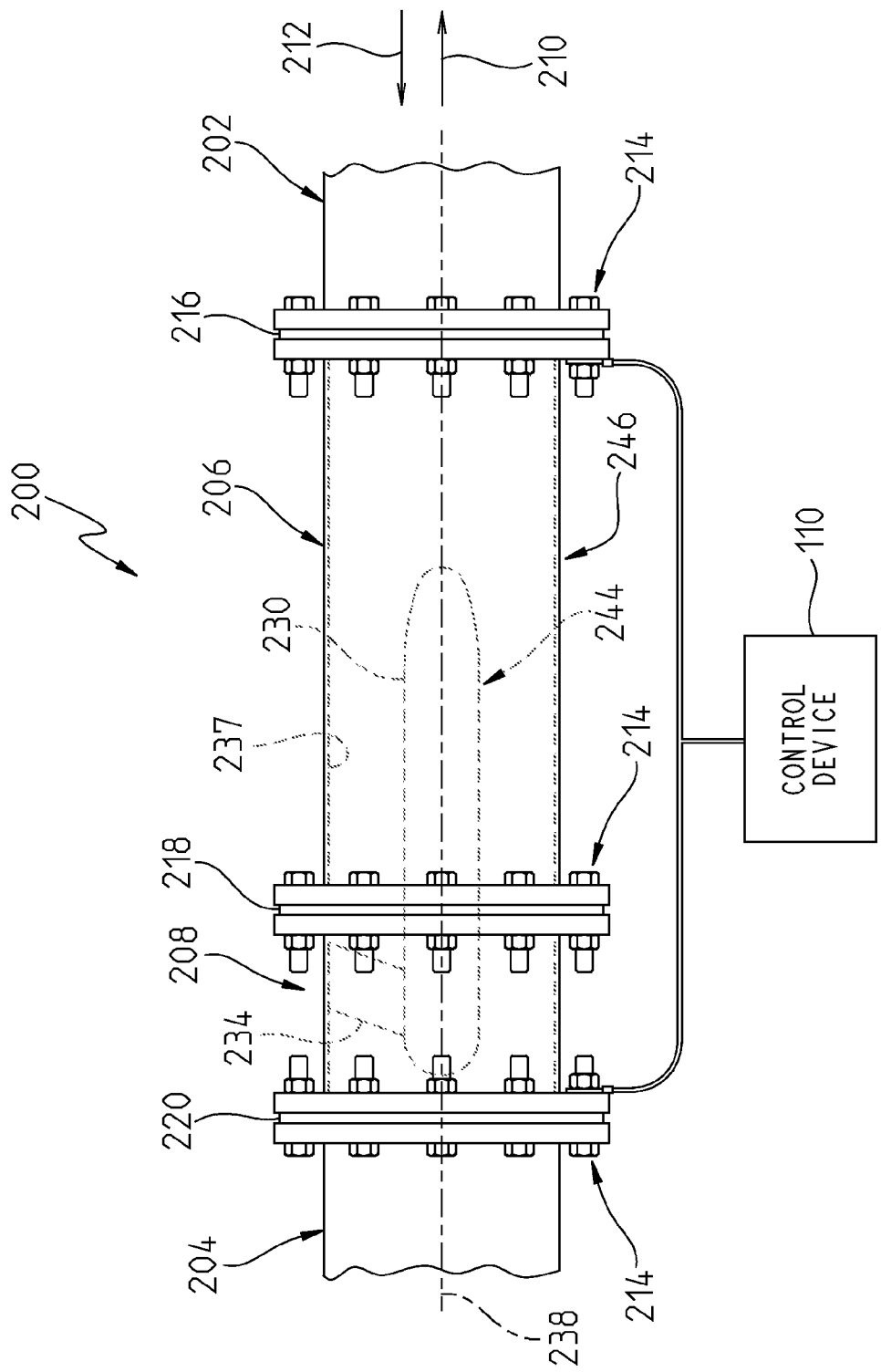
FIG. 2 illustrates an exemplary treatment device having a first, central electrode and a second electrode.

Referring to FIGS. 2-5, an exemplary treatment device 200 is shown. Referring to FIG. 2, fluid 106 travels through an interior of fluid conduits 202, 204, 206, and 208 in generally either direction 210 or direction 212. Fluid conduits 202, 204, 206, and 208 each are illustratively cylindrical pipe sections, but may have any suitable shape.

In one embodiment, each of fluid conduits 202, 204, 206, and 208 are made of a conductive material. Fluid conduits 202, 204, 206, and 208 are coupled together with couplers 214, illustratively bolts and nuts. A gasket 216 is placed between fluid conduits 202 and 206 to provide a fluid tight seal therebetween. In a similar manner, a gasket 218 is placed between fluid conduits 208 and 206 to provide a fluid tight seal therebetween and a gasket 220 is placed between fluid conduits 208 and 204 to provide a fluid tight seal therebetween. Gaskets 218 and 220 are made from an insulating material such that fluid conduit 208 is electrically isolated from fluid conduit 204 and fluid conduit 206. Further, the couplers 214 coupling fluid conduit 208 to either fluid conduit 204 or fluid conduit 206 are either made from an insulating material or have insulating sleeves such that fluid conduit 208 is electrically isolated from fluid conduit 204 and fluid conduit 206. In one embodiment, the portions of the respective fluid conduits that come in contact with couplers 214 are coated with an insulating coating.

Figure 3:
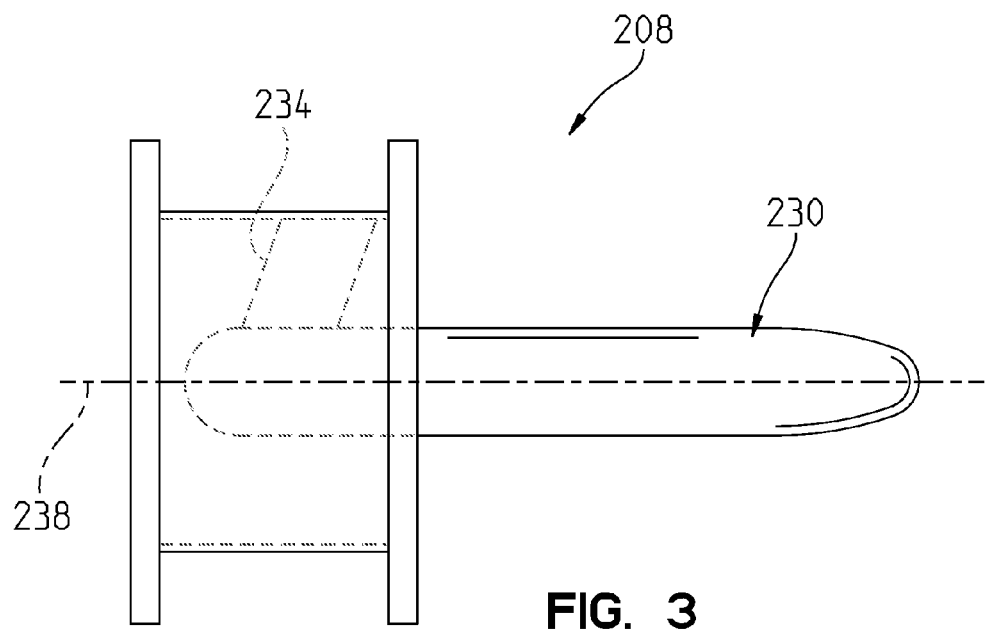
FIG. 3 illustrates a portion of the exemplary treatment device of FIG. 2.
Figure 8:
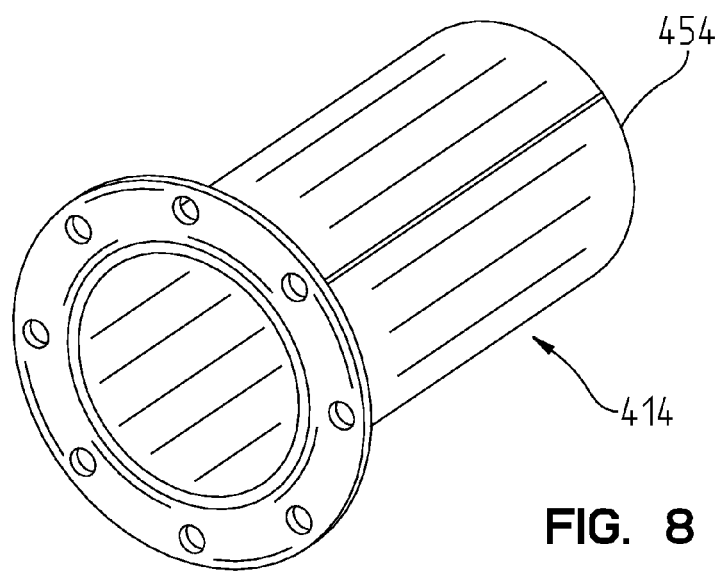
FIG. 8 illustrates a perspective view of an insulating sleeve of the exemplary treatment device of FIG. 7.
Figure 4:
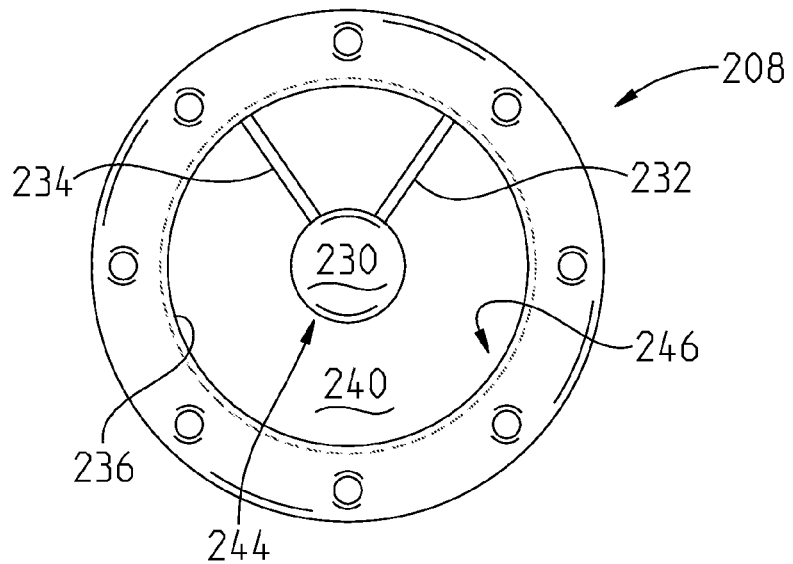
FIG. 4 is an end view of the portion of the exemplary treatment device of FIG. 3.

Referring to FIG. 3, fluid conduit 208 is coupled to an elongated body 230 through supports 232 and 234 (see FIG. 4). Supports 232 and 234 are coupled to an inner wall 236 of fluid conduit 208. Elongated body 230 is positioned on a centerline 238 of fluid conduit 208. Centerline 238 is coaxial with a centerline of fluid conduit 206. Further, in the illustrated embodiment, elongated body 230 is generally symmetrical about centerline 238. As such, elongated body 230 is generally equidistant from inner wall 236 (see FIG. 4) of fluid conduit 208 and from an inner wall 237 (see FIG. 2) of fluid conduit 206. Referring to FIG. 4, fluid 106 flows in the region 240 between elongated body 230 and inner wall 236. In one embodiment, elongated body is not positioned on centerline 238 and/or is not symmetrical about centerline 238.

Control unit 110 is coupled to a portion of fluid conduit 206 and a portion of fluid conduit 208. Elongated body 230 serves as a first electrode 244 due to its connection to fluid conduit 208. In one embodiment, one or both of inner wall 236 of fluid conduit 208 and supports 332 and 334 are coated with an insulating material. As such, first electrode 244 relative to fluid 106 may be limited to elongated body 230. Inner surface 237 of fluid conduit 206 serves as a second electrode 246. As stated above, fluid conduit 206 is electrically isolated from fluid conduit 208. As shown in FIG. 2, elongated body 230 extends into fluid conduit 206.

As mentioned herein elongated body 230 corresponds to first electrode 244 and inner wall 237 of fluid conduit 206 corresponds to second electrode 246. By placing elongated body 230 in the center of fluid conduit 206, the distance from first electrode 244 and second electrode 246 is reduced compared to a situation wherein a first electrode is mounted to a first side of a pipe and a second electrode is mounted to a second side the pipe. This means that the arrangement shown in FIG. 2 may treat fluid 106 with a smaller potential difference than would be used with the electrodes mounted on opposite sides of fluid conduit 206 because the distance between first electrode 244 and second electrode 246 is reduced. An exemplary arrangement wherein a first electrode 102 and a second electrode 104 are mounted to opposite sides of a fluid conduit is provided in U.S. patent application Ser. No. 11/837,225, filed Aug. 10, 2007, titled "WATER TREATMENT DEVICE", the disclosure of which is expressly incorporated by reference herein. In one embodiment, only a portion of inner wall 237 is in contact with fluid 106 and thus serves as second electrode 246.

Control unit 110 establishes a potential difference between first electrode 244 and second electrode 246. Control unit 110 varies the potential difference established between first electrode 244 and second electrode 246 to treat fluid 106.

Figure 5:
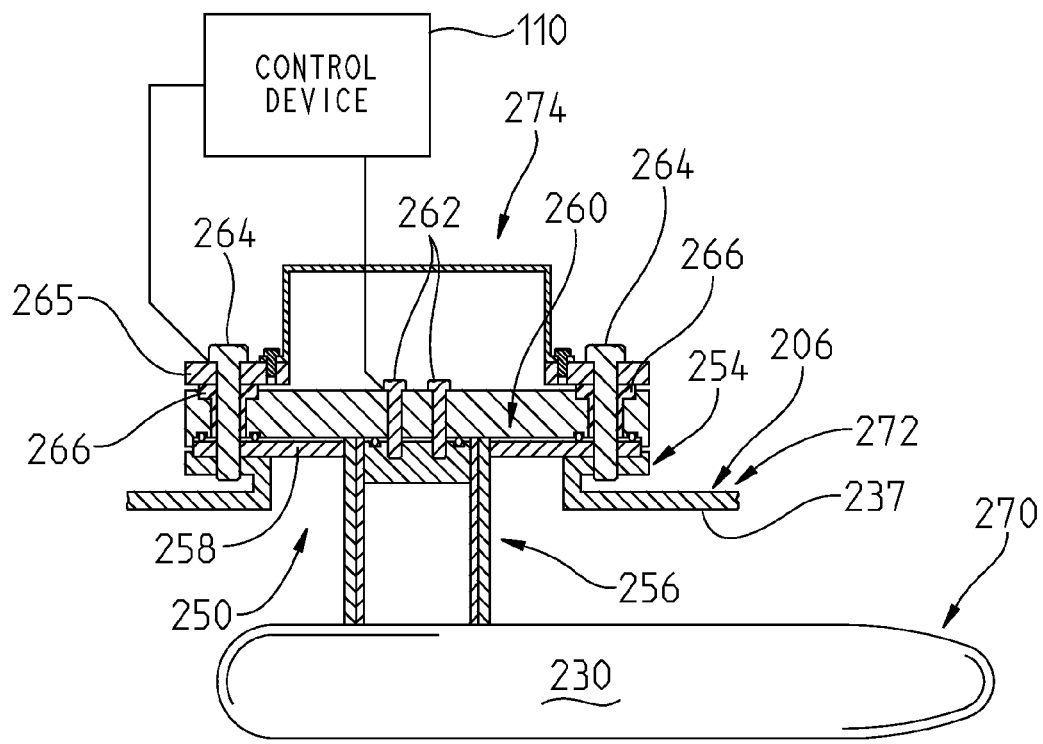
FIG. 5 is a sectional view of an alternative arrangement of the exemplary treatment device of FIG. 2.

Referring to FIG. 5, another embodiment of treatment device 200 is shown. In this embodiment, a separate fluid conduit 208 is not implemented. Rather, fluid conduit 206 includes an opening 250, such as egg shaped or other suitable shape, in inner wall 237 through which elongated body 230 is passed. A support 254 is welded or otherwise coupled to fluid conduit 206. A support 256 is coupled to elongated body 230. An insulating plate 258 is positioned on top of support 254. A support member 260 is placed on top of insulating plate 258. Support member 260 is coupled to support 256 through couplers 262. A top mounting plate 265 is positioned on top of support member 260 and is secured to support 254 through couplers 264. Couplers 264 are isolated from support member 260 through insulating sleeves 266.

Couplers 262 and couplers 264 are connected to control unit 110. Due to their connections to couplers 262 and 264, respectively, elongated body 230 and pipe section 206 act as a first electrode 270 and a second electrode 272. A cover 274 covers couplers 262.

Figure 6:
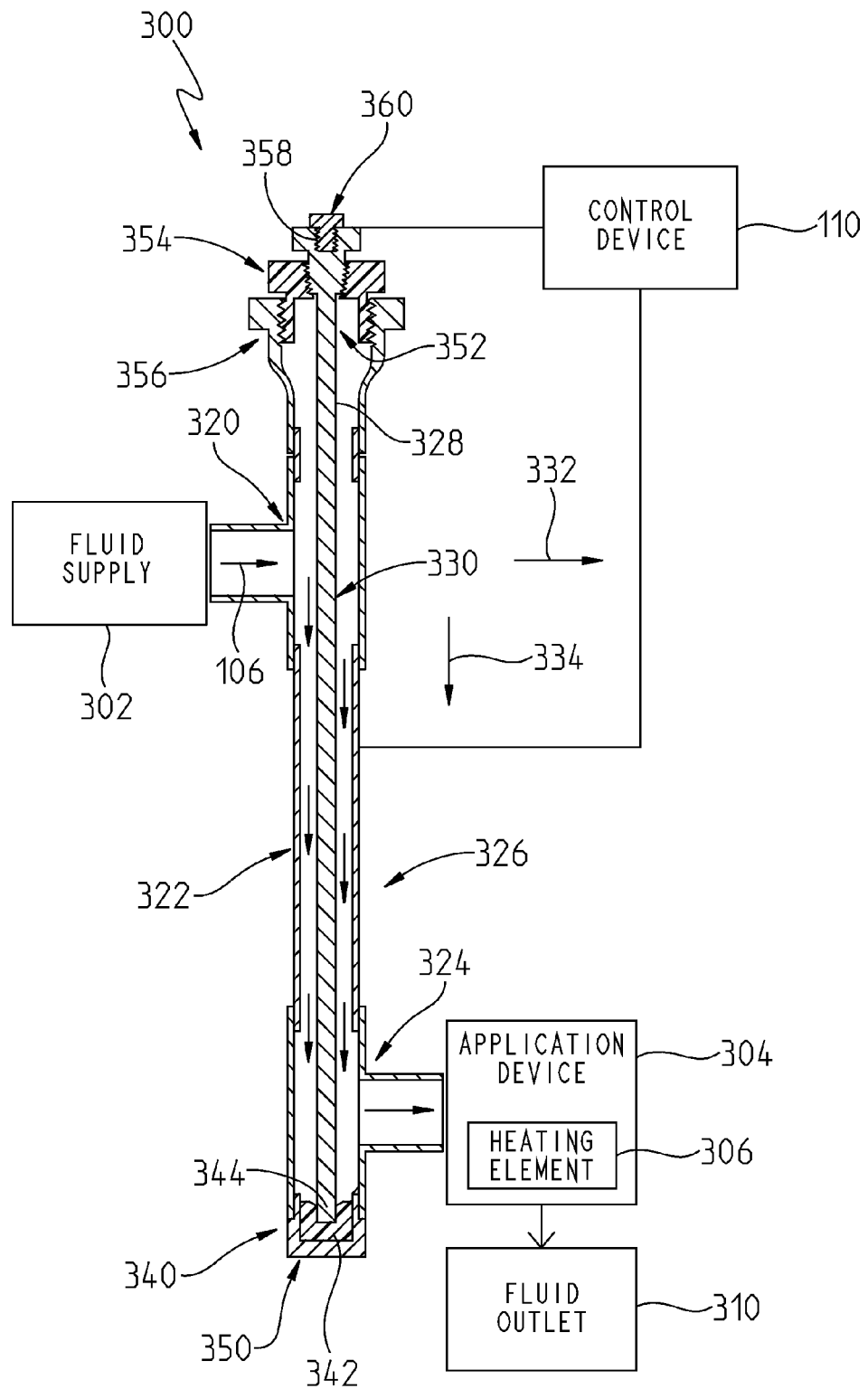
FIG. 6 illustrates an exemplary treatment device.

Referring to FIG. 6, an exemplary treatment device 300 is shown. Treatment device 300 is illustrated between a fluid supply 302 and an application device 304. Application device 304 heats the fluid supplied to it with a heating element 306. Exemplary application devices 304 include once through systems, such as water heaters, washing machines, instant hot water system, coffee or other hot beverage makers, and other suitable application devices. Application device 304 provides the heated fluid to a fluid outlet 310. In one embodiment, such as a hot beverage maker, fluid outlet 310 is a part of application device 304. In one embodiment, such as a hot water heater, fluid outlet 310 is spaced apart from application device 304. Exemplary fluid outlets include faucets, showerheads, spray heads, and other suitable fluid outlets.

Figure 6A:
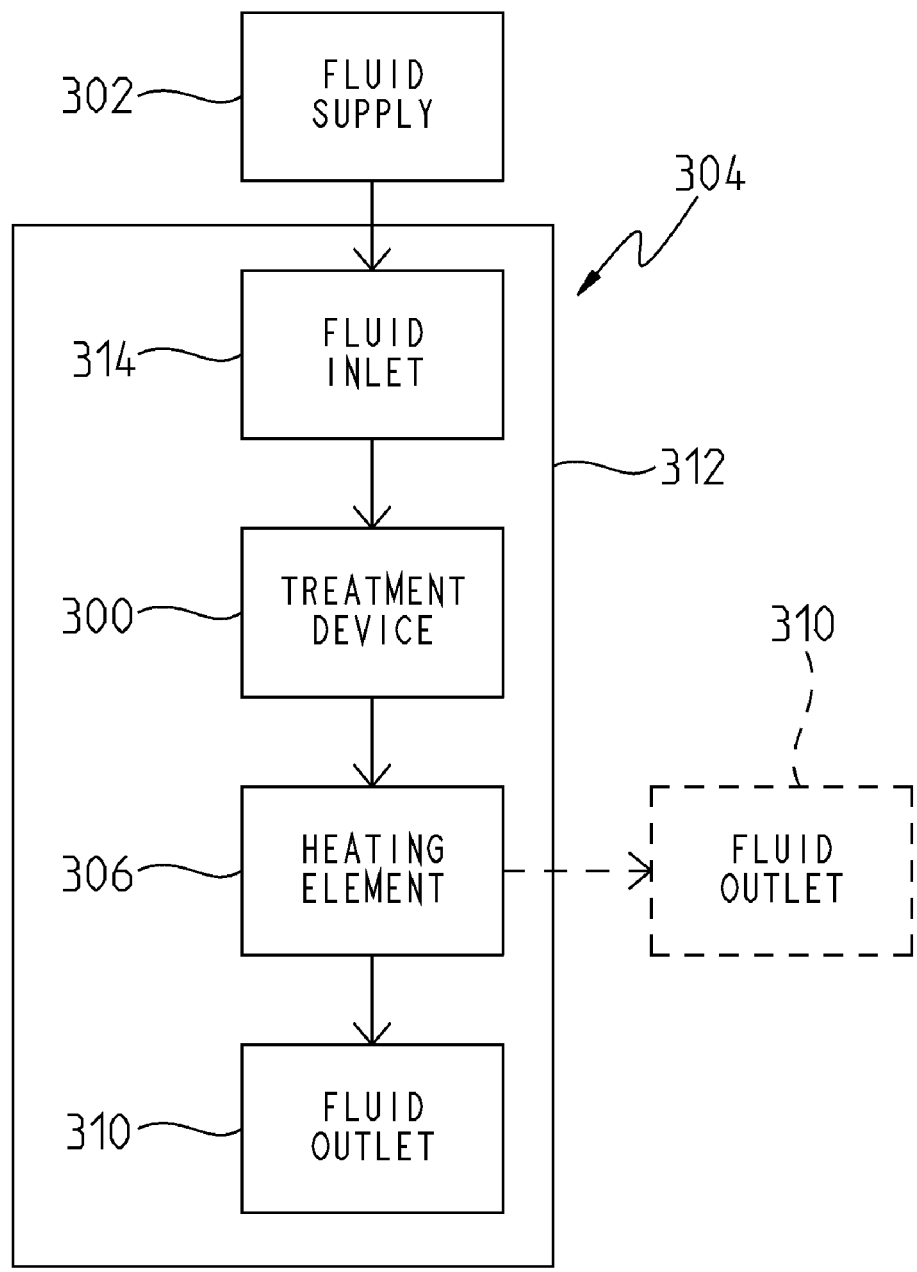
FIG. 6A illustrates the incorporation of an exemplary treatment device into an application device.

In one embodiment, as illustrated in FIG. 6A, treatment device 300 is incorporated into application device 304. Treatment device 300 is positioned within a housing 312 of application device 304. Fluid is provided to treatment device 300 through a fluid inlet 312 of application device 304. The fluid passes through treatment device 300 and heating element 306 and onto fluid outlet 310. In one embodiment, fluid outlet 310 is supported by housing 312. In one embodiment, fluid outlet 310 is spaced apart from housing 312. Although treatment device 300 is illustrated as being included within housing 312 of application device 304, any of the treatment devices disclosed herein or in U.S. patent application Ser. No. 11/837,225, filed Aug. 10, 2007, titled "WATER TREATMENT DEVICE", the disclosure of which is expressly incorporated by reference herein, or a wrap-around system may be used in place of treatment device 300.

Returning to FIG. 6, fluid 106 enters treatment device 300 through an inlet fluid conduit 320, flows through fluid conduit 322, and exits treatment device 300 through an outlet fluid conduit 324. At least one of inlet fluid conduit 320, fluid conduit 322, and outlet fluid conduit 324 is made of a conductive material and serves as a first electrode 326. Illustratively, fluid conduit 322 is connected to control unit 110 and serves as first electrode 326. A conductive body 328 positioned within fluid conduit 322 is connected to control unit 110 and serves as a second electrode 330. Illustratively, conductive body 328 is a cylindrical rod. In one embodiment, conductive body 328 is positioned along a centerline of fluid conduit 322.

Fluid 106 flows into inlet fluid conduit 320 in direction 332 and is redirected in direction 334. The fluid then continues in direction 334 and flows between fluid conduit 322 and conductive body 328. Fluid 106 then enters outlet fluid conduit 324 and is once again directed in direction 332. The direction of flow of fluid 106 may take on any suitable arrangement provided that fluid 106 travels between fluid conduit 322 and conductive body 328 which serve as first electrode 326 and second electrode 330, respectively.

In one embodiment, inlet fluid conduit 320, fluid conduit 322, and outlet fluid conduit 324 are made of copper which is coupled together. In one embodiment, inlet fluid conduit 320, fluid conduit 322, and outlet fluid conduit 324 are coupled together by brazing. A lower end 340 of outlet fluid conduit 324 includes a support 342 which receives a first end 344 of conductive body 328. Support 342 is made of an insulating material to isolate second electrode 330 from first electrode 326. In the illustrated embodiment, support 342 is received in a cap 350 which is coupled to lower end 340 of outlet fluid conduit 324.

An upper end 352 of conductive body 328 is supported by a support 354. Support 354 is made of an insulating material to isolate second electrode 330 from first electrode 326. In the illustrated embodiment, support 354 is threadably coupled to a second support 356 which is coupled to inlet fluid conduit 320. The upper end of conductive body 328 includes a threaded opening 358 which receives a bolt 360. A connection ring to control unit 110 is held in contact with conductive body 328 by bolt 360.

Figure 7:
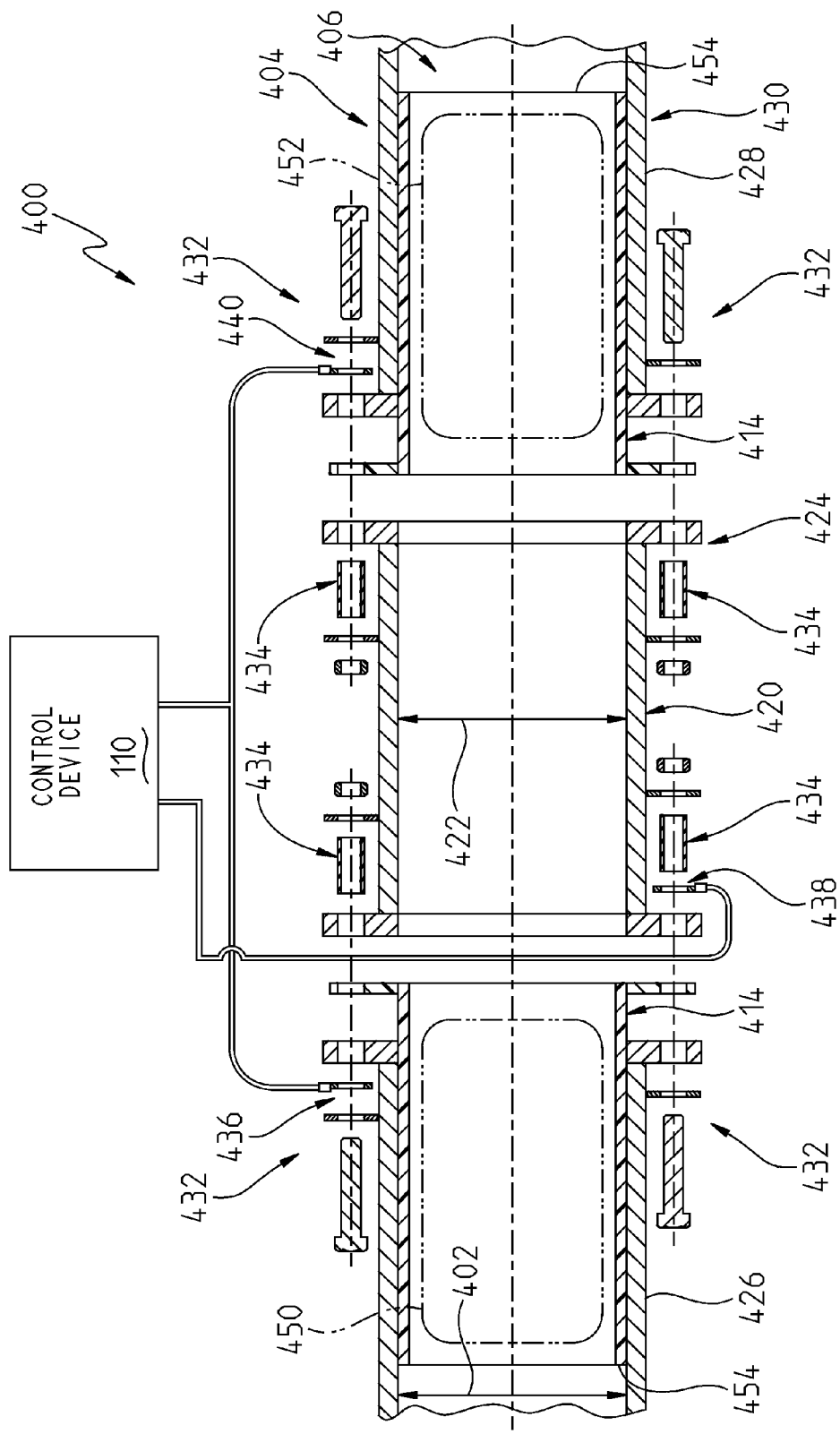
FIG. 7 illustrates an exemplary treatment device.

Referring to FIG. 7, an exemplary treatment device 400 is shown. Treatment device 400 is for use in applications wherein it is not desired to reduce a diameter 402 of a pipe by placing electrodes within the pipe. Exemplary applications include a pipeline 404 wherein a cleaning apparatus is passed through a passageway 406 of the pipeline 404 to clean an interior of pipeline 404. As shown in FIG. 7, treatment device 400 maintains a generally full diameter passageway 406 through a pipeline 404. The only reduction in diameter 402 is due to the presence of an insulating liner 414. In one embodiment, liner 414 is replaced with an insulating coating or an insulating section of pipe is included.

A section of pipeline 404 is replaced with a pipe 420 having a diameter 422 generally equal to diameter 402 of pipeline 404. Pipe 420 is made of a conductive material and is connected to control unit 110. Pipe 420 therefore functions as a first electrode 424. At least one of the adjacent sections of pipeline 404 are also made of a conductive material and connected to control unit 110. Illustratively, sections 426 and 428 are connected to control unit 110. The connected portions of pipeline 404 serve as a second electrode 430.

Section 426 is coupled to pipe 420 through a plurality of couplers 432, illustratively bolts and nuts. Couplers 432 are isolated from section 426 and pipe 420 through an insulating sleeve 434. A first connection ring 436 is held in contact with section 426 by couplers 432. First connection ring 436 is connected to control unit 110 and thereby couples sections 426 to control unit 110. In a similar manner, a second connection ring 438 is held in contact with pipe 420 by couplers 432. Second connection ring 438 is connected to control unit 110 and thereby couples pipe 420 to control unit 110.

Section 428 is coupled to pipe 420 through a plurality of couplers 432. A connection ring 440 is coupled to first connection ring 436 and keeps sections 428 at the same potential as sections 426. The connection between section 426 and pipe 420 and the connection between pipe 420 and section 428 form a fluid tight seal. In one embodiment, a gasket is provided between section 426 and pipe 420 and between pipe 420 and section 428. The gasket should be made from an insulating material to isolate first electrode 424 from second electrode 430. In one embodiment, insulating liner 414 acts as a gasket.

In one embodiment, a first end 454 of liner 414 is coupled to its respective pipe section to prevent the movement of liner 414 relative to the pipe section. In one embodiment, liner 414 is replaced with an insulating coating, a section of pipe made of an insulating material, or other suitable insulators.

Figure 9:
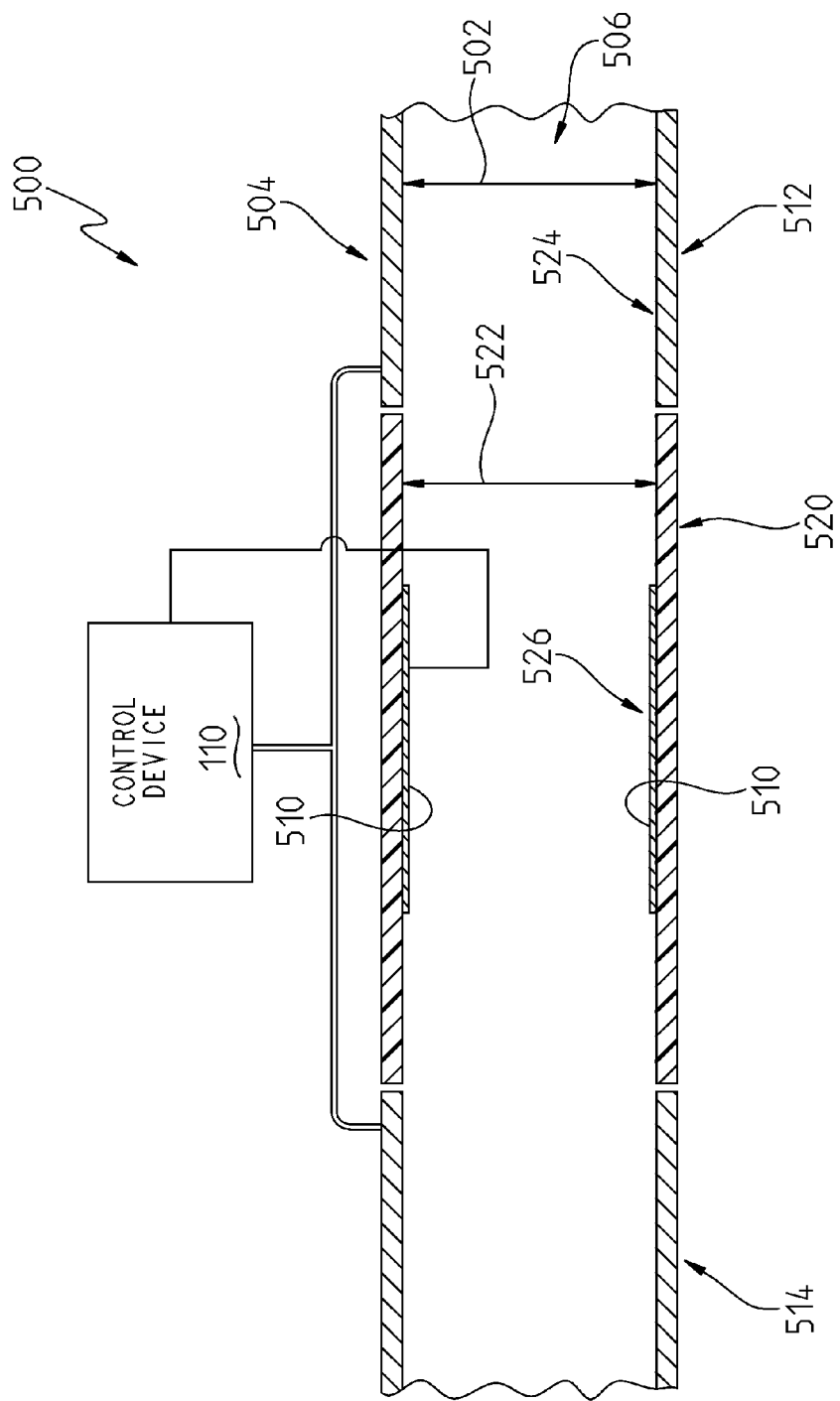
FIG. 9 illustrates an exemplary treatment device.

Referring to FIGS. 9-11 another exemplary treatment device 500 is shown. Treatment device 500 is for use in applications wherein it is not desired to reduce a diameter 502 of a pipe 504 by placing electrodes within the pipe. As shown in FIG. 9, treatment device 500 maintains a generally full diameter passageway 506 through pipe 504. The only reduction in diameter 502 is due to the presence of electrode members 510.

A section of pipe 504 is replaced with a pipe section 520 having a diameter 522 generally equal to diameter 502 of pipe 504. Pipe section 520 supports electrode members 510. Pipe section 520 is coupled to pipe sections 512 and 514 of pipe 504 through flanges and couplers, such as shown in FIG. 7 for treatment device 400. In one embodiment, pipe section 520 is made of an insulating material. Exemplary isolating materials include PVC pipe. In one embodiment, pipe section 520 is made of a conductive material and electrode members 510 are isolated from pipe section 520 through couplers 530.

One or both of pipe sections 512 and 514 are made of a conductive material or support an electrode. In the illustrated embodiment, pipe sections 512 and 514 are made of a conductive material and serve as a first electrode 524 due to electrical connection to control unit 110. Electrode members 510 are operatively coupled together and act as a second electrode 526.

Referring to FIG. 10, electrode member 510 has a generally curved profile 532 along one extent and a generally straight profile 534 along another extent. In one embodiment, profiles 532 and 534 generally match the respective transverse and longitudinal profiles of pipe section 520. In one embodiment, profile 532 has a greater radius than the transverse section of pipe section 520 such that second end 550 (see FIGS. 10 and 12) of electrode member 510 is biased into contact with the interior wall 544 of pipe section 520.

Electrode member 510 includes a first aperture 536 and a second aperture 538. First aperture 536 receives a coupler 530, as shown in FIG. 12. A Belleville washer 538 is positioned between a head of coupler 530 and electrode member 510 and acts as a tensioning member to hold electrode member 510 generally against an inner wall 544 of pipe section 520. A nut 546 on the outside of pipe section 520 is tightened to couple electrode member 510 to pipe section 520. An electrical connection to control unit 110 may be established by placing a ring member 546 on top of coupler 530 and threading a screw 548 into an aperture in coupler 530.

Second aperture 538 is elongated along a longitudinal direction of electrode member 510. As such, changes in the length of electrode member 510 long extent 534 may be accommodated. In a similar manner a first end 550 of electrode member 510 is not coupled to pipe section 510 through couplers 530. As such, changes in the length of electrode member 510 along extent 532 may be accommodated.

Referring to FIG. 12, a second end 554 of electrode member 510 overlaps first end 550 of another instance of electrode member 510. In one embodiment, the collection of electrode members 510 cover the transverse section of pipe section 520 as shown in FIG. 11. In one embodiment, at least one electrode member 510 is used that overlaps itself to cover the transverse section of pipe section 520. In the illustrated embodiment, three electrode members 510 are implemented. In one embodiment, one to three electrode members 510 are implemented.

Figure 13:
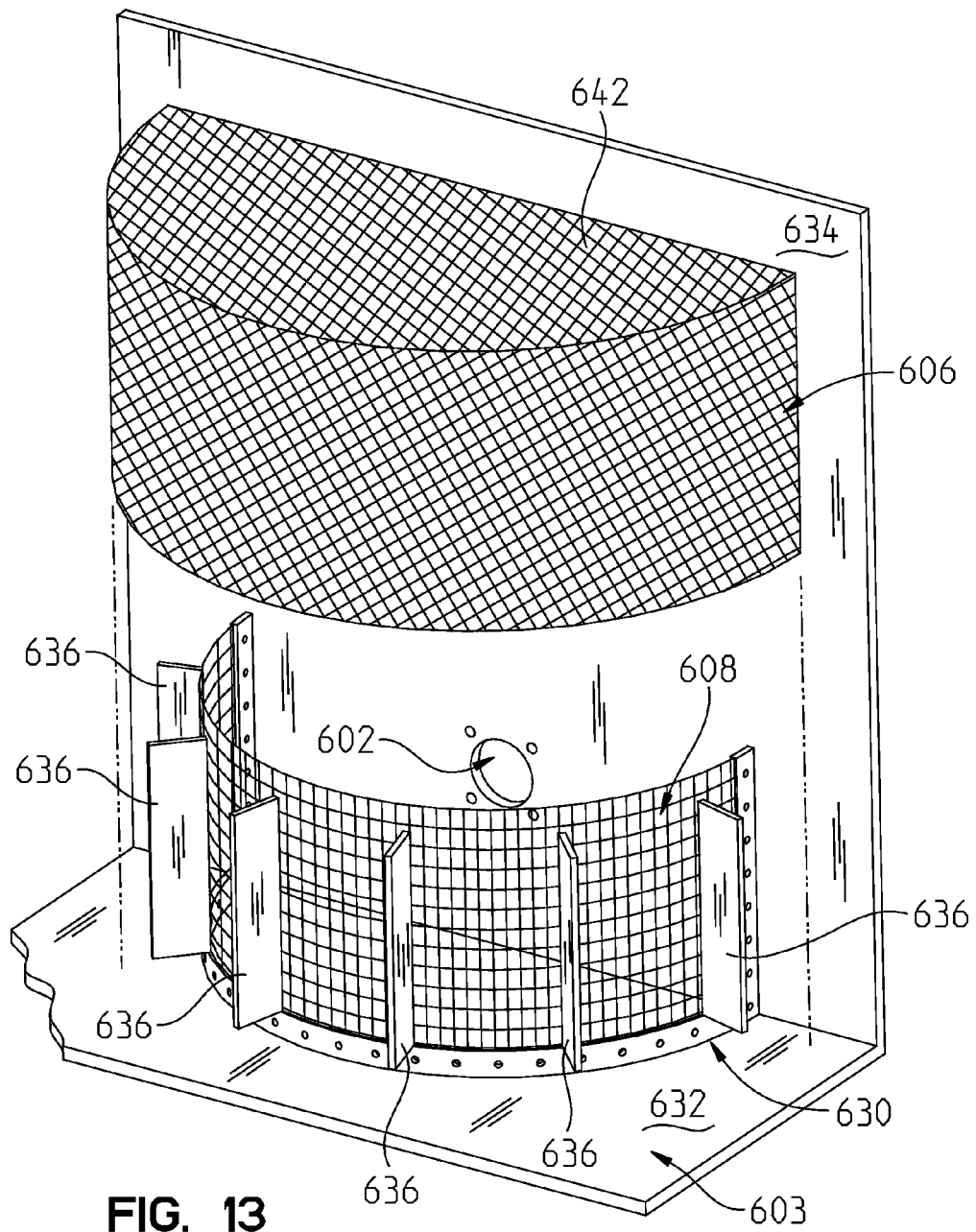
FIG. 13 illustrates an exemplary treatment device having spaced apart first and second electrodes.
Figure 14:
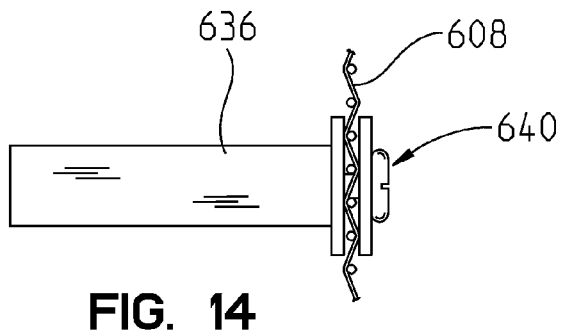
FIG. 14 illustrates a support member of the exemplary treatment device of FIG. 13.
Figure 15:
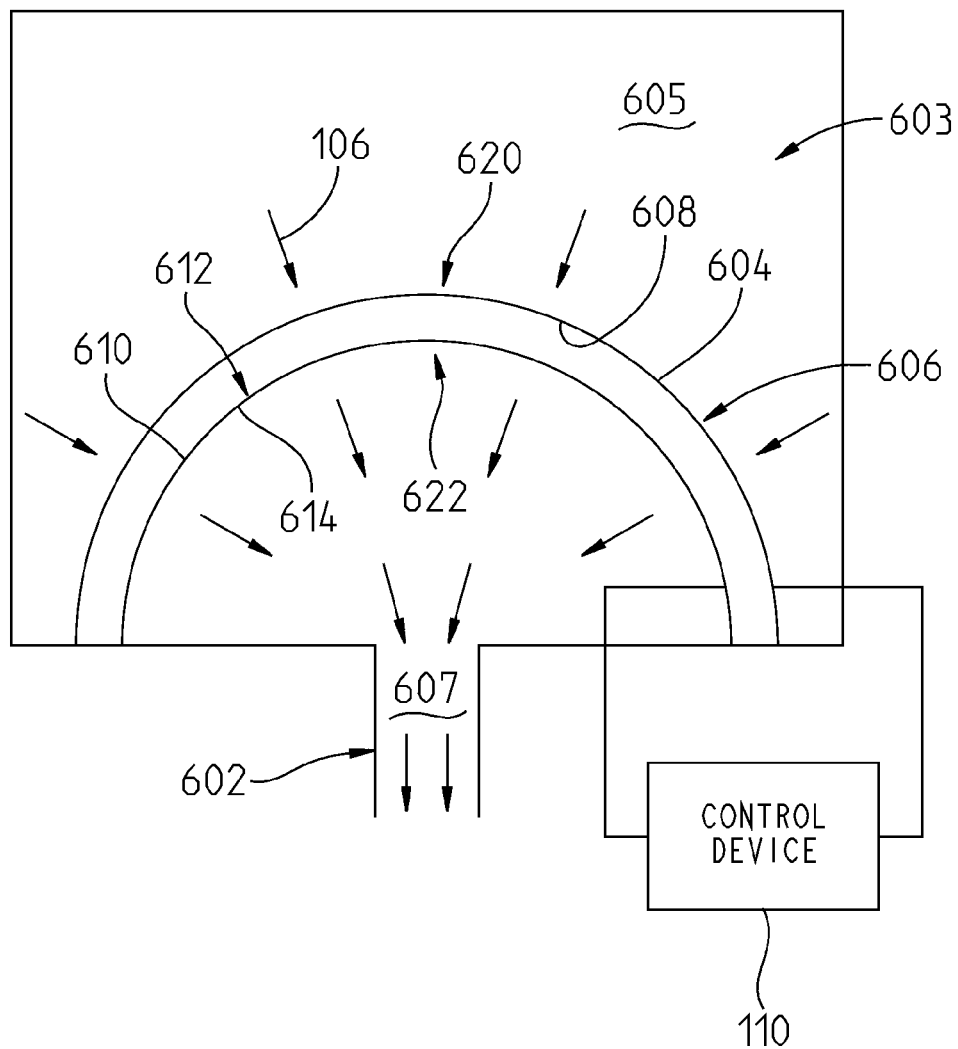
FIG. 15 illustrates a representative top view of the treatment device of FIG. 13.

Referring to FIGS. 13-15, an exemplary treatment device 600 is shown. Treatment device 600 is illustrated installed over an intake pipe 602 (see FIG. 15) in a sump basin of a cooling tower. Treatment device 600 may be installed in other environments, as well, including within a pipe.

Figure 16:
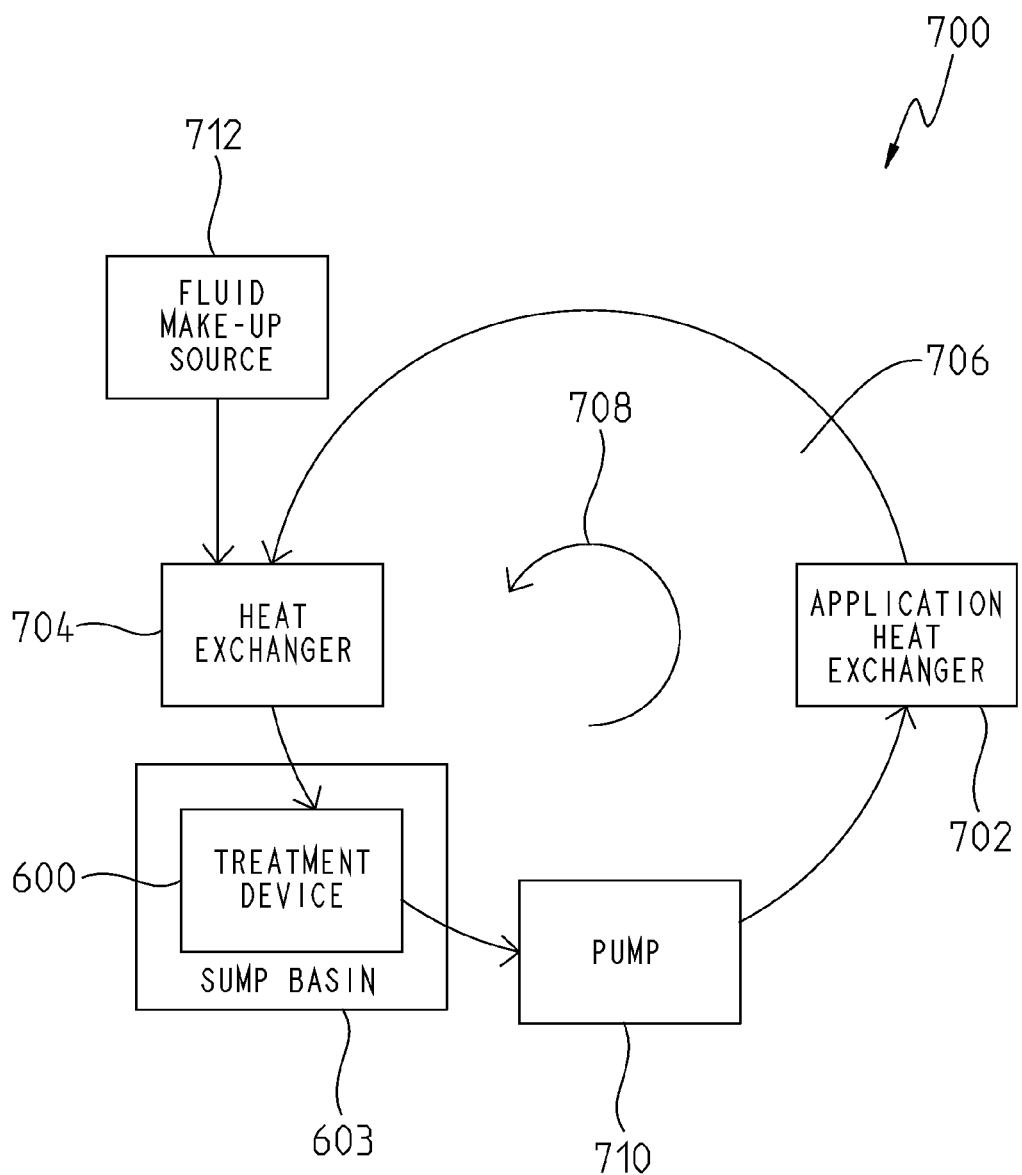
FIG. 16 illustrates an exemplary cooling system incorporating one or more treatment devices.

Referring to FIG. 15, fluid is introduced into a basin 603 of the sump of a cooling tower. The fluid 106 passes from a first location 605 on a first side 604 of a first electrode member 606 to a second side 608 of electrode member 606. Fluid 106 next encounters first side 610 of a second electrode member 612 and flows to second side 614 of second electrode member 612 to a second location 607. The fluid 106 then passes through intake pipe 602 and travels through a heat exchanger system 700, such as shown in FIG. 16.

Heat exchanger system 700 includes an application heat exchanger 702, a heat exchanger 704, and piping 706 connecting heat exchanger 704 and application heat exchanger 702. Fluid 106 flows through application heat exchanger 702, heat exchanger 704, and piping 706 in a circuit 708. Heat exchanger 704 cools fluid 106 to a lower temperature. Exemplary heat exchangers 704 include cooling towers. The cooled fluid 106 is collected in sump basin 603 and is pumped by a pump 710 back to application heat exchanger 702 whereat it takes on heat. Application heat exchanger 702 corresponds to the application use of the cooled fluid 106 provided by heat exchanger 704. Exemplary application heat exchangers 702 include chillers, fan coil units, manufacturing machinery, electrical power generation equipment, and other suitable devices. In one embodiment, application heat exchanger 702 is a heat exchanger for a pressurized closed loop circuit that has an application heat exchanger of its own. Exemplary closed loop circuits are provided in U.S. Provisional Patent Application Ser. No. 60/834,826, filed Aug. 1, 2006 and U.S. Utility patent application Ser. No. 11/830,148, filed Jul. 30, 2007, the disclosures of which are expressly incorporated by reference herein.

In the illustrated embodiment, circuit 708 is an open loop and a makeup fluid source 712 is provided to replace any fluid 106 that may be lost. An exemplary heat exchanger 704 for an open loop circuit 708 is an evaporation cooling tower. With an evaporation cooling tower, fluid 106 may be lost due to evaporation, drift, and the removal of fluid during a blow down operation.

Returning to FIG. 15, first electrode member 606 and second electrode member 612 are electrically connected to control unit 110, but are electrically isolated from each other except through fluid 106. As such, first electrode member 606 and second electrode member 612 act as first electrode 620 and second electrode 622, respectively.

As shown, in FIGS. 13 and 15, fluid 106 to reach intake 602 must pass from outside of both electrodes 620 and 622, through electrode 620 to a space between first electrode 620 and second electrode 622, and through electrode 622. In one embodiment, first electrode member 606 and second electrode member 612 are taller than a level of fluid 106 in sump basin 603.

Figure 15A:
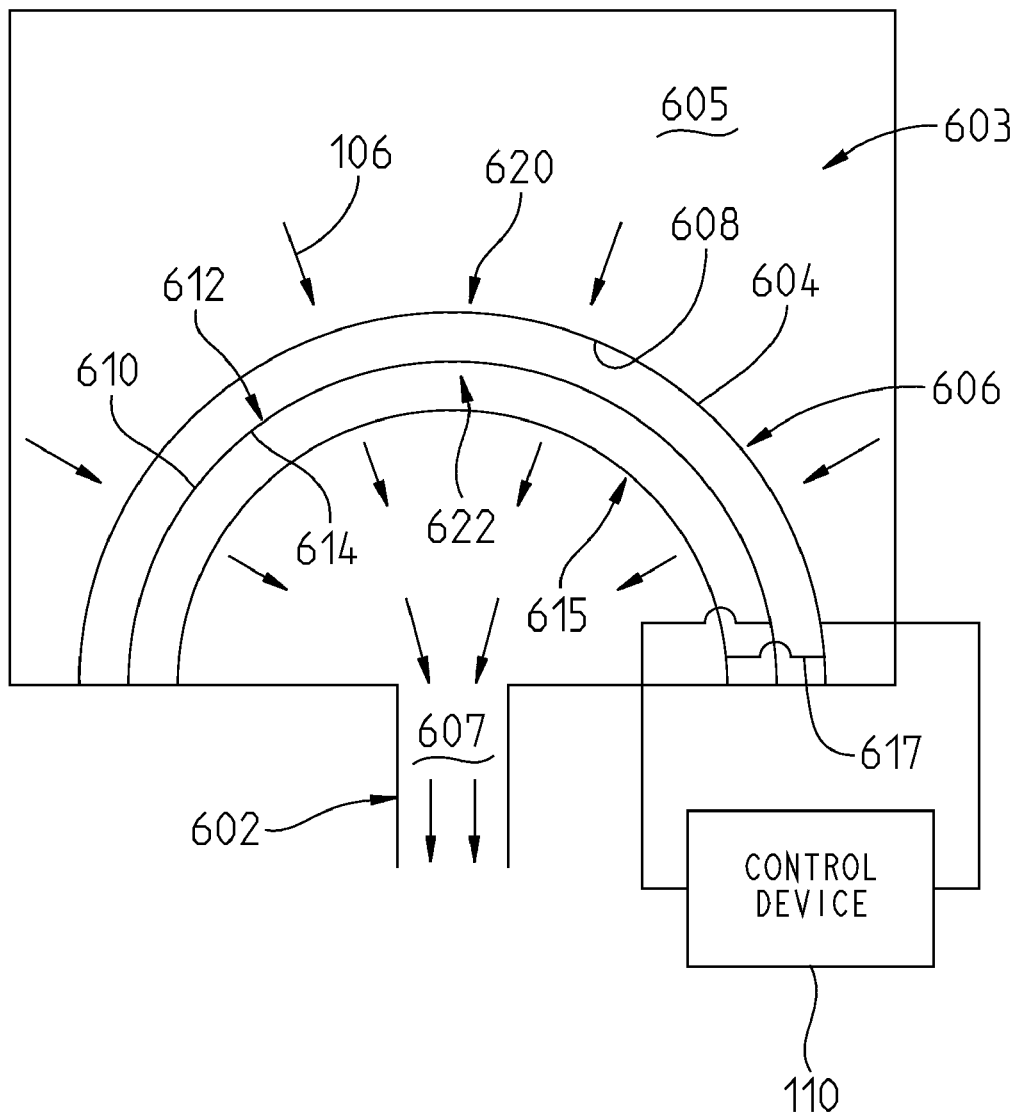
FIG. 15A illustrates a representative top view of an alternative arrangement of the treatment device of FIG. 13.

Referring to FIG. 15A, a third electrode member 615 is included. Third electrode member 615 is coupled to first electrode member 606 through a connection 617 and is at the same potential as first electrode member 606. By having first electrode member 606 and third electrode member 615 on opposite sides of second electrode member 608 a balanced electrode arrangement is provided. Fluid 106 as it travels from first location 605 to second location 607 passes through first electrode member 606, followed by through second electrode member 612, and then through third electrode member 615.

First electrode member 606 and second electrode member 612, and if present third electrode member 615, include open regions to permit the flow of fluid 106 there through. In one embodiment, first electrode member 606 and second electrode member 612 (and third electrode member 615, if present) may have any suitable shape that permits fluid 106 to pass from first side 604 of first electrode member 606 to second side 608 of first electrode member 606 and from first side 610 of second electrode member 612 and flows to second side 614 of second electrode member 612. Exemplary configurations include a screen, a plate with openings therein, louvers, spaced apart members, such as tubes, and other suitable configurations.

Figure 18:
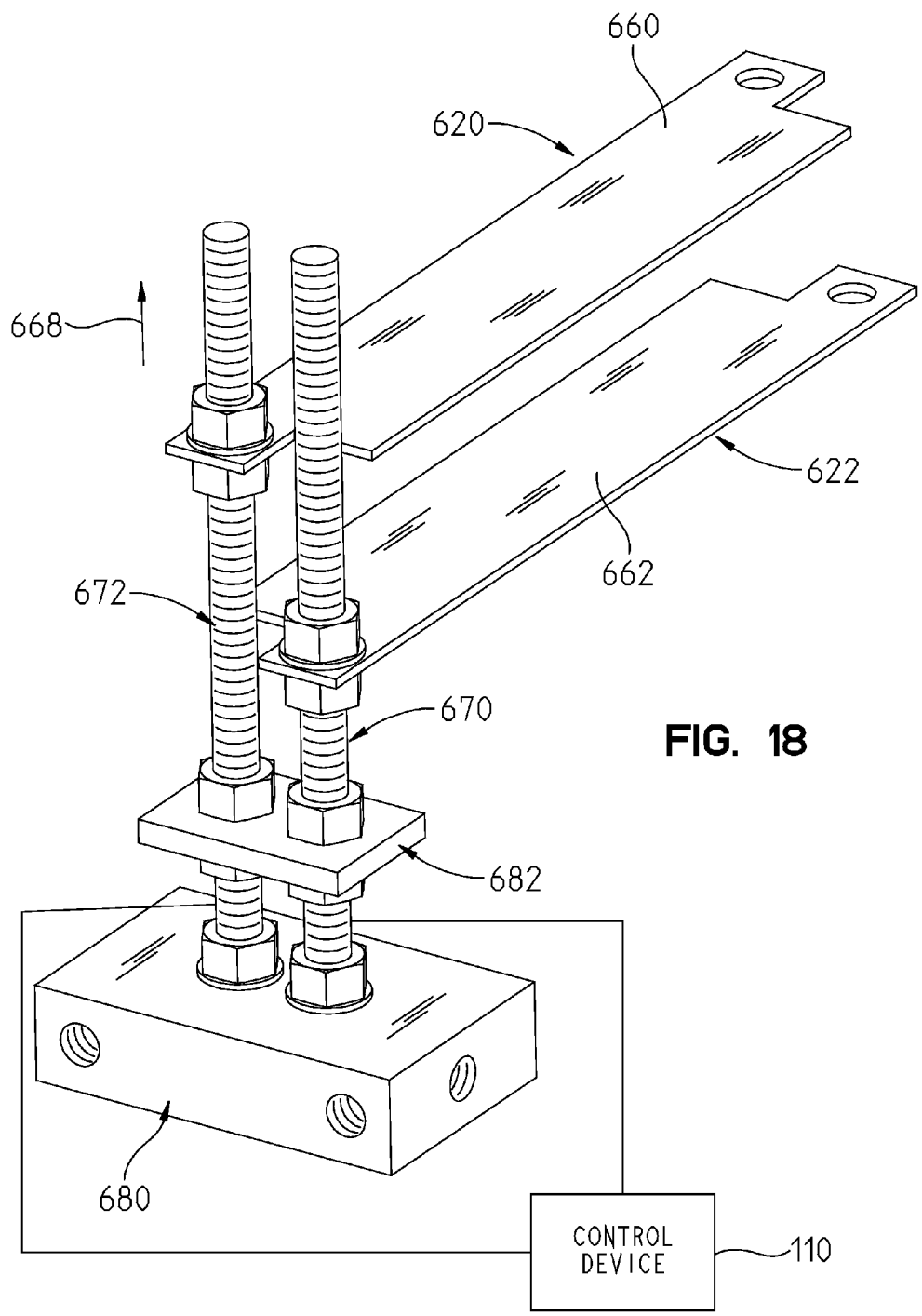
FIG. 18 illustrates another alternative arrangement of the treatment device of FIG. 13 including louvers.

In one embodiment, first electrode member 606 and second electrode member 612 are screens, such as illustrated in FIG. 13. In one embodiment, screen members 606 and 608 have a mesh size of about ⅛ of an inch to about ⅜ of an inch. The mesh size may also be selected by open area percentage in the range of about 30% to about 70%. In one embodiment, first electrode member 606 and second electrode member 612 are metal plates with openings therein. In one embodiment, first electrode member 606 and second electrode member 612 include a plurality of spaced apart louver members, such as illustrated in FIG. 18. In one embodiment, first electrode member 606 and second electrode member 612 include a plurality of spaced apart tubular members, such as illustrated in FIG. 21.

Referring back to FIG. 13, first electrode member 606 and second electrode member 612 are screens. An insulating member 630 isolates second screen member 612 from a floor 632 and a wall 634 of sump basin 603. In one embodiment, isolating member 630 is along a top edge of second screen member 612 as well. In one embodiment, first screen member 606 is electrically coupled to sump basin 603. In one embodiment, first screen member 606 is also electrically isolated from sump basin 603.

First screen member 606 is isolated from second screen member 612 through insulating standoffs 636 spaced around second screen member 612. In one embodiment, standoffs 636 are made of a nylon plastic, ceramic, or other suitable insulating materials. Referring to FIG. 14, a coupler 640 is coupled to standoff 636 and couples second screen member 612 to standoff 636. In a similar manner, first screen member 606 may be coupled to standoff 636.

First screen member 606 is shown having a top portion 642 as well which covers the region between second screen member 612 and wall 634. Top portion 642 prevents debris, such as leaves and other types of debris, from entering intake 602 and from shorting the connection between first electrode member 606 and second electrode member 612. In one embodiment, top portion 642 is not made of a screen material, such as top portion 643 in FIG. 17

In one embodiment, the spacing between first screen member 606 and second screen member 612 is selected to allow a sufficient amount of time for fluid 106 to be treated. In one embodiment, fluid 106 has a flow rate of about 100 gallons per minute to about 500 gallons per minute and the spacing between first screen member 606 and second screen member 612 is about 2 inches when a power of at least about 1 watt having a voltage of at least about 5 volts is applied between first electrode 620 and second electrode 622.

Referring to FIG. 18, in one embodiment, first electrode 620 and second electrode 622 are provided as spaced apart louvers 660 and 662. respectively. Although only one pair of louvers 660, 662 are shown, multiple pairs of louvers may extend in direction 668. Each of louvers 662 are coupled to a first support member 670. Each of louvers 660 are coupled to a second support member 672. Support members 670 and 672 are electrically isolated from each other and are coupled to control unit 110.

A mounting block 680 is coupled to both of support members 670 and 672 to support each in a spaced apart relationship. Mounting block 680 is made of an insulating material. Further, insulating support members 682 are provided along a length of support members 670 and 672 to provide structural rigidity. Fluid 106 passes from a first side of louvers 660 and 662, between louvers 660 and 662 to a second side of louvers 660 and 662. In one embodiment, louvers 660 and 662 are positioned so that fluid 106 must travel between louvers 660 and 662 to travel from first location 605 to second location 607. Although louvers 660 and 662 are shown being generally horizontally oriented, louvers 660 and 662 may be oriented in any direction including vertically oriented. The spacing between louvers 660 and 662 is generally constant.

Figure 22:
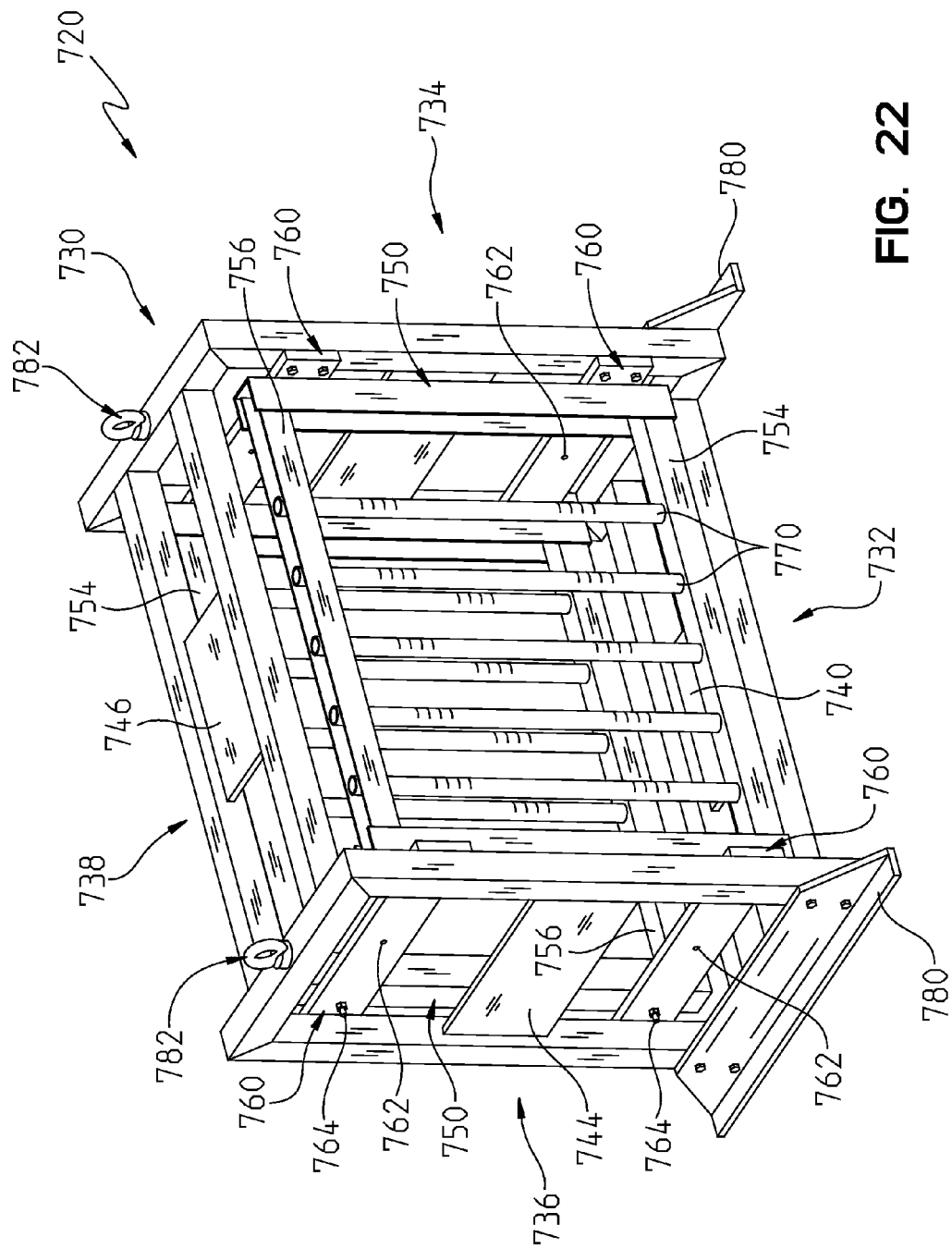
FIG. 22 illustrates an assembly view of the electrode arrangement of FIG. 21.
Figure 23:
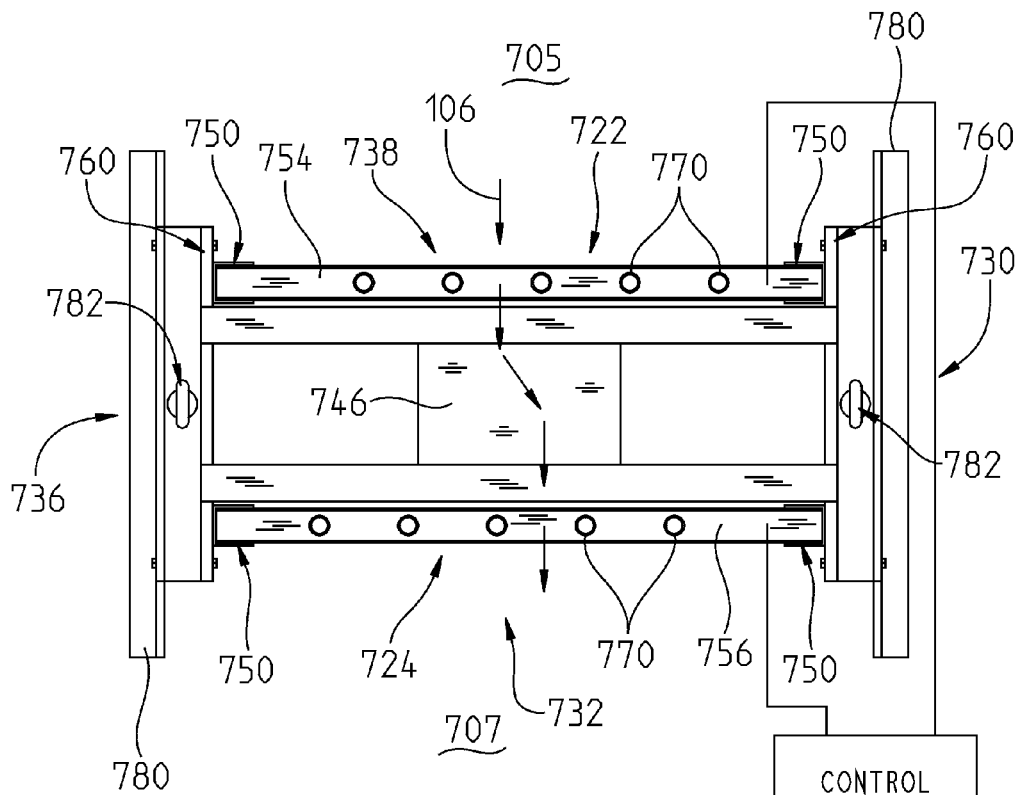
FIG. 23 is a top view of an exemplary treatment device including the electrode arrangement of FIG. 21.

Referring to FIGS. 21-23, a fluid treatment device 720 having a first electrode member 722 and a second electrode member 724 is illustrated.

Referring to FIG. 23, first electrode member 722 and second electrode member 724 are coupled to control unit 110. First electrode member 722 and 724 are isolated from each other except through fluid 106.

Referring to FIG. 21, a frame structure 730 is shown. Frame 730 includes a first end frame member 732, a first side frame member 734, and a second frame side member 736, and a top frame member 738. Each of frame members 732, 734, 736, and 738 are joined together by any suitable coupling means. Exemplary coupling means include welding and fasteners. Further, stiffening members 740, 742, 744, and 746 are provided for frame members 732, 734, 736, and 738, respectively.

Electrode members 722 and 724 are each held by a pair of longitudinally spaced rails 750. Each of rails 750 includes a channel 752 for receiving first end member 754 and second end member 756 of the respective one of first electrode member 722 and second electrode member 724. Rails 750 further include a capped bottom 758 which vertically positions first electrode member 722 and second electrode member 724 respectively. In one embodiment, electrode members 722 and 724 include rails and frame 730 supports protruding members for reception in the rails of the electrode members 722 and 724.

Rails 750 are mounted to rail mounting blocks 760. Each of rail mounting blocks 760 includes a plurality of apertures 762 which receive locaters 764 mounted to rails 750. In one embodiment, rail mount members 760 include a plurality of apertures 762 which permit the adjustment of the spacing between electrodes 722 and 724. At least one of rail member 750 and rail mount member 760 is made from an insulating material or includes an insulating coating to insulate electrodes 722 and 724 from frame 730 and thus from each other.

Each of electrode 722 and 724 include a plurality of tubular members 770 extending between first end member 754 and second end member 756. In one embodiment, the tubular members are made of stainless steel and have an outside diameter in the range of about 0.375 inches to about 0.750 inches with a center line to center line spacing of about 2 inches to about 6 inches. Although tubular members 770 are shown as generally cylindrical, any suitable shape may be used. The tubular cross-section provides increased surface area while having a lower weight than a solid member.

Second electrode 724 is structurally equivalent to first electrode 722. Tubular members 770 are positioned relative to end members 754 and 756 such that when the structure is flipped to produce second electrode 724, tubular members 770 of second electrode 724 are offset relative to tubular members 770 of first electrode 722, as shown in FIG. 23. By having the tubular members 770 offset the flow of fluid 106 from first location 705 to second location 707 is not in a straight line but is somewhat impeded by first electrode 722 and second electrode 724.

Returning to FIG. 21, frame 730 further includes a pair of feet 780. Feet 780 assists in preventing fluid treatment device 730 from tipping over due to the flow of fluid 106. Frame 734 further includes eyelets 782 which are used to assist in transporting fluid treatment device 720.

Figure 17:
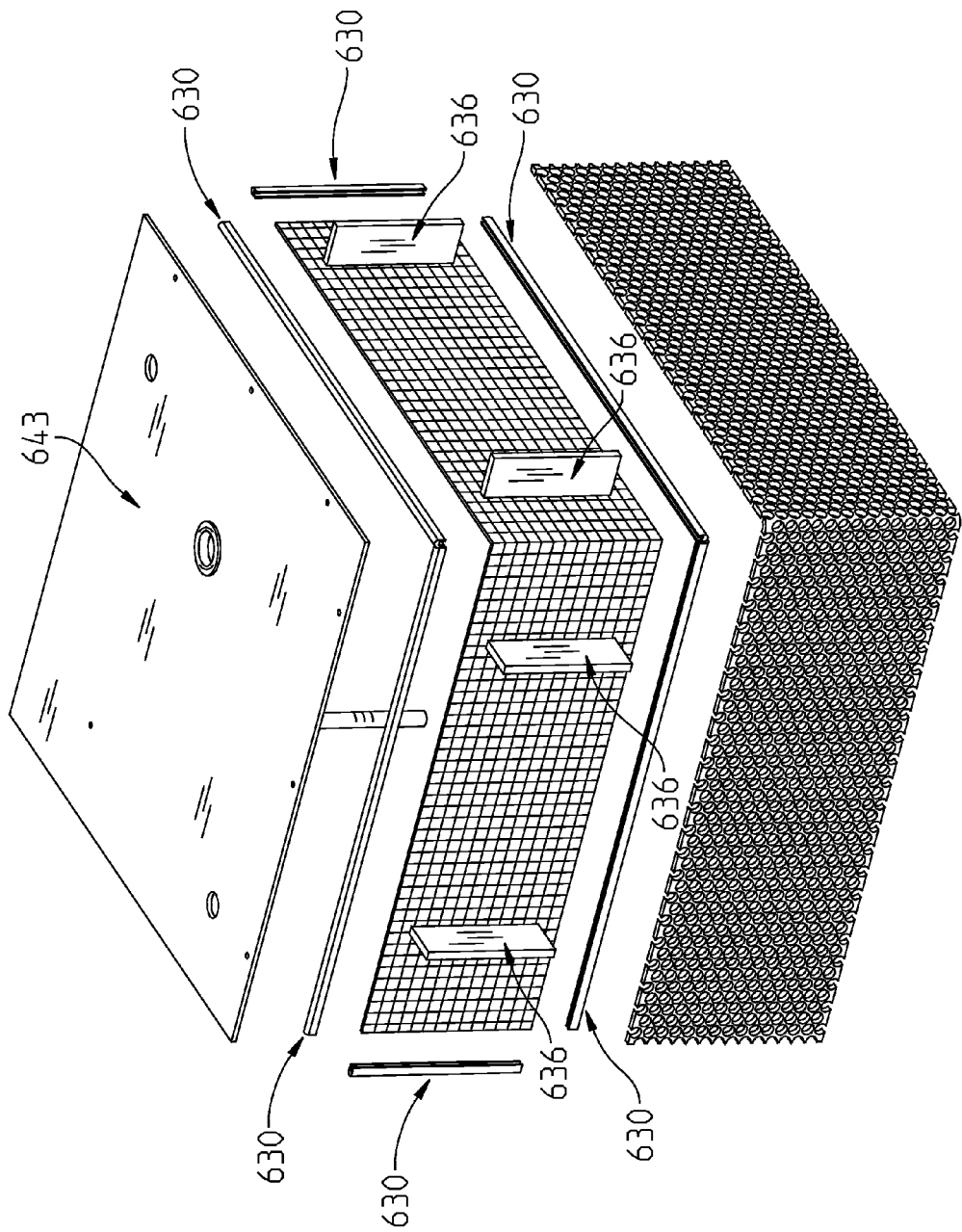
FIG. 17 illustrates a further alternative arrangement of the exemplary treatment device of FIG. 13.

Although shown with first electrode 722 and second electrode 724 arranged in a straight configuration, first electrode 722 and second electrode 724 may taken on a suitable shape, including the semicircular shape of FIG. 13 and the corner shape of FIG. 17. Fluid treatment device 720 may be positioned adjacent to sump outlet 602.

Figure 23A:
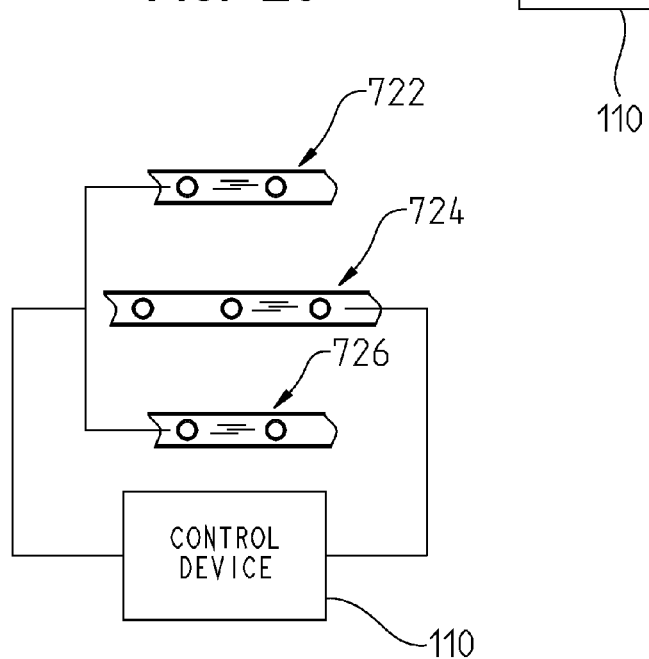
FIG. 23A is a partial top view of the exemplary treatment device of FIG. 23 including an alternative electrode arrangement.

In an alternative arrangement shown in FIG. 23A. A third electrode member 726 is included. The third electrode member 726 is received by a third pair of rails 750. First electrode member 722 and third electrode member 726 are positioned on each side of second electrode member 724. First electrode member 722 and third electrode member 726 are coupled together and act as a single electrode. The tubular members of electrode members 722, 724, and 726 are shown extending in a generally vertical direction, but may extend in any direction. Further, the direction of extent may vary from one electrode member to the next electrode member.

Figure 19:
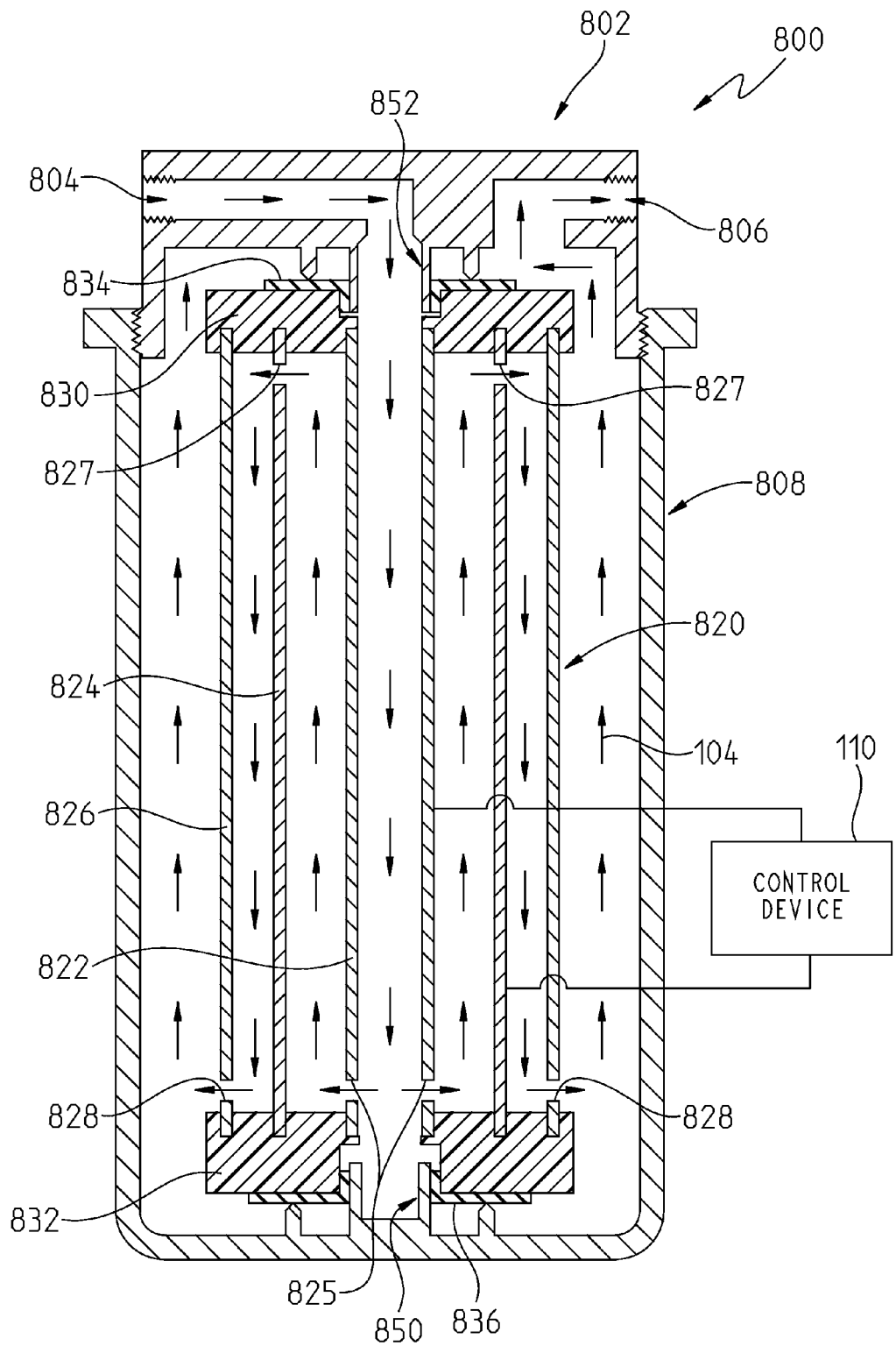
FIG. 19 illustrates an exemplary cartridge treatment device.

Referring to FIG. 19, a filter housing 800 is shown. Filter housing 800 includes a top portion 802 having a fluid inlet 804 and a fluid outlet 806 and a bottom portion 808. Typically, top portion 802 and bottom portion 808 cooperate to hold a filter (not shown) in such a manner that fluid 106 must transverse a filter media to pass from fluid inlet 804 to fluid outlet 806. Exemplary filter housings 800 are commonly used in water filtering applications, such as residential filtering applications.

Figure 20:
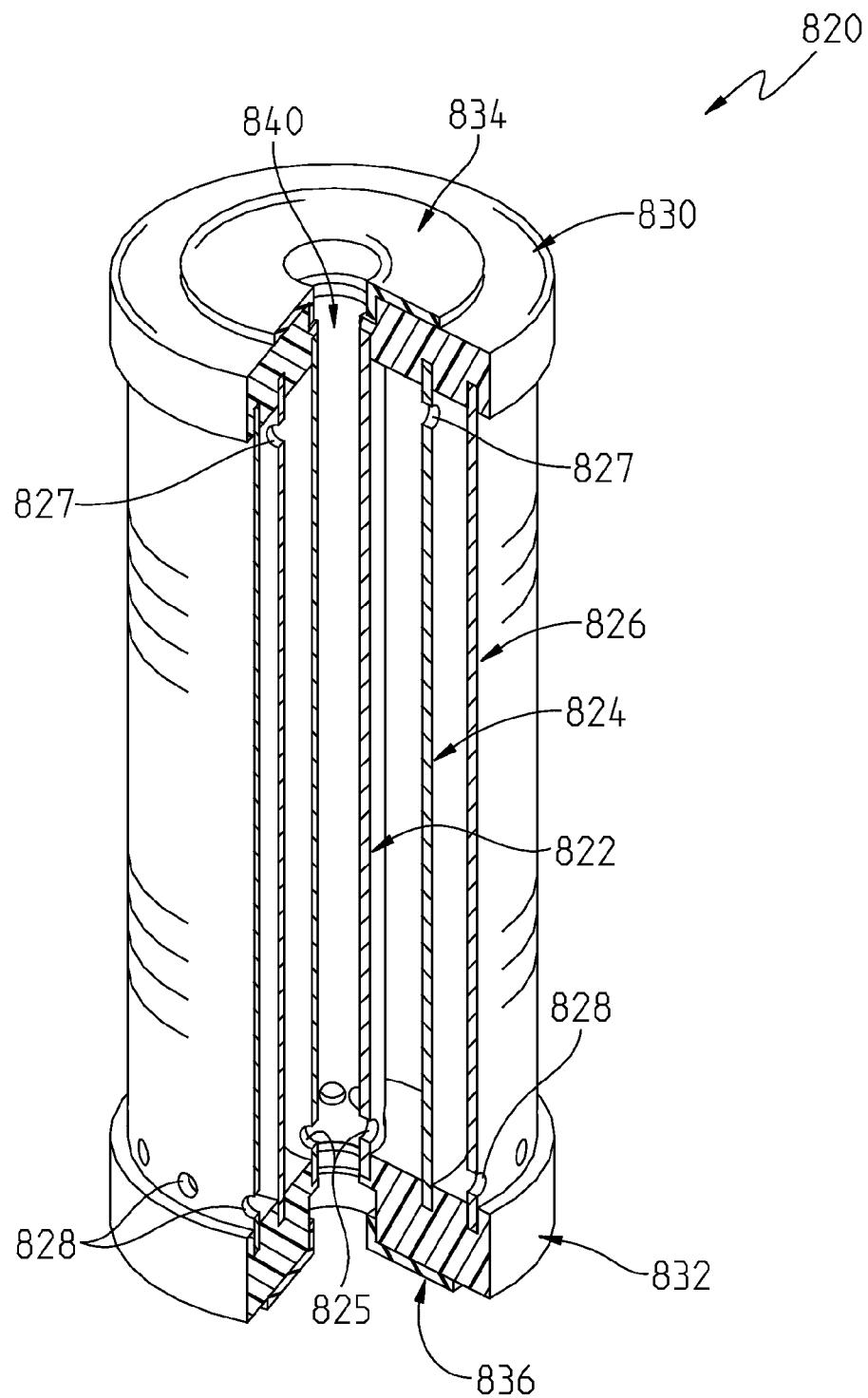
FIG. 20 illustrates a perspective view of the cartridge of the treatment device of FIG. 16.

In FIG. 19, the filter is replaced with a treatment device 820. Treatment device 820 includes a first tube 822, a second tube 824, and a third tube 826. As shown in FIG. 20, tubes 822, 824, and 826 are supported along a top edge by an insulating support member 830 and along a bottom edge by an insulating support member 832. Further, seal members 834 and 836 are coupled to support members 830 and 832, respectively. Seals 834 and 836 seal treatment device 820 relative to filter housing 800.

Fluid 106 enters a top opening 840 (see FIG. 20) in support member 830, travels down a fluid passageway of tube 822, passes through transfer holes 825 in tube 822. Referring to FIG. 19, transfer holes 825 transfer fluid 106 from the inside of tube 822 to the outside of tube 822. Fluid 106 then travels up along the outside of tube 822 and the inside of tube 824 and passes through transfer holes 827 in tube 824. Fluid 106 then travels down along the outside of tube 824 and inside of tube 826 and passes through transfer holes 828. The fluid 106 then travels up the outside of tube 826 and the inside of bottom portion 808 of filter housing and out the fluid outlet 806.

Fluid treatment device 820 may be installed in the same manner that filters are replaced. Bottom portion 808 is unscrewed from top portion 802. Fluid treatment device 820 is centered on a receiver 850 of bottom portion 808 and is received on the top side by fluid conduit 852. Bottom portion 808 is then screwed back together with top portion 802.

Tubes 822 and 826 are coupled together and to control unit 110 as a first electrode. Tube 824 is coupled to control unit 110 as a second electrode. Fluid 106 is treated as it passes between first tube 822 and second tube 824 and as it passes between second tube 824 and third tube 826.

In one embodiment, control unit 110 provides an alternating potential difference between conduit 108 and 100. Exemplary control units and their operation are provided in U.S. patent application Ser. No. 11/837,225, filed Aug. 10, 2007, titled "FLUID TREATMENT DEVICE", the disclosure of which is expressly incorporated by reference herein.

Although the invention has been described in detail with reference to certain preferred embodiments, variations and modifications exist within the spirit and scope of the invention as described and defined in the following claims.

The invention claimed is:

1. A fluid treatment device for treating a fluid passing from a first location to a second location, the fluid treatment device comprising:
   a first electrode positioned between the first location and the second location, the first electrode having a plurality of opening there through to permit the fluid to pass from a first side of the first electrode to a second side of the first electrode;
   a second electrode positioned between the first location and the second location, the second electrode having a plurality of opening there through to permit the fluid to pass from a first side of the second electrode to a second side of the second electrode; and
   a control device coupled to the first electrode and the second electrode to provide an alternating potential difference between the first electrode and the second electrode and to monitor a conductivity between the first electrode and the second electrode, wherein at least one characteristic of the alternating potential difference is adjusted by the control device based on an indication of the conductivity between the first electrode and the second electrode, a period of the alternating potential difference being at least about 3 kHz, wherein the at least one characteristic includes a peak voltage and a duty cycle and in response to an increase in the conductivity between the first electrode and the second electrode the control device first reduces the peak voltage until a threshold peak voltage is reached and subsequently reduces the duty cycle of the alternating potential difference.

2. The fluid treatment device of claim 1, wherein the fluid as it travels from the first location to the second location must pass from the first side of the first electrode through the plurality of openings in the first electrode to a region between the first electrode and the second electrode and through the plurality of openings in the second electrode to the second side of the second electrode.

3. The fluid treatment device of claim 2, wherein the first electrode and the second electrode are screens.

4. The fluid treatment device of claim 2, further comprising a cover coupled to the first electrode, the second location being an opening to an intake pipe, the cover keeping debris spaced apart from the intake pipe.

5. The fluid treatment device of claim 1, further comprising a third electrode positioned proximate the second side of the second electrode, the third electrode having a plurality of openings there through to permit the fluid to pass from a first side of the third electrode to a second side of the third electrode and the third electrode being electrically coupled to the first electrode.

6. The fluid treatment device of claim 1, wherein the first electrode includes a plurality of louvers and the second electrode includes a plurality of louvers.

7. The fluid treatment device of claim 6, wherein the plurality of louvers of the first electrode are generally vertically spaced apart and the plurality of louvers of the second electrode are generally spaced apart, a first louver of the plurality of louvers of the first electrode being positioned between a pair of louvers of the plurality of louvers of the second electrode.

8. The fluid treatment device of claim 1, further comprising a frame having a first holder which receives the first electrode and a second holder which receives the second electrode, the first holder and the second holder keeping the first electrode and the second electrode spaced apart.

9. The fluid treatment device of claim 8, wherein the first electrode and the second electrode each include a plurality of spaced apart tubular members, a first tubular member of the first electrode being offset relative to the second electrode such that the first tubular member of the first electrode is positioned generally between a pair of tubular members of the second electrode.

10. A fluid treatment device for treating a fluid passing from a first location to a second location, the fluid treatment device comprising:
   a first electrode positioned between the first location and the second location, the first electrode including a plurality of spaced apart tubular members, the fluid being able to pass from a first side of the first electrode to a second side of the first electrode through the space between the plurality of spaced apart tubular members;
   a second electrode positioned between the first location and the second location, the second electrode including a plurality of spaced apart tubular members, the fluid being able to pass from a first side of the second electrode to a second side of the second electrode through the space between the plurality of spaced apart tubular members; and a control device coupled to the first electrode and the second electrode to provide an alternating potential difference between the first electrode and the second electrode, a period of the alternating potential difference being at least about 3 kHz, wherein the plurality of spaced apart tubular members of the first electrode are arranged in a first row and the plurality of spaced apart tubular members are arranged in a second row, the second row being behind the first row and the plurality of spaced apart tubular members of the second row being positioned to align with a space between at least two adjacent tubular members of the first row, wherein the control device monitors a conductivity between the first electrode and the second electrode, wherein at least one characteristic of the alternating potential difference is adjusted by the control device based on an indication of the conductivity between the first electrode and the second electrode, wherein the at least one characteristic includes a peak voltage and a duty cycle and in response to an increase in the conductivity between the first electrode and the second electrode the control device first reduces the peak voltage until a threshold peak voltage is reached and subsequently reduces the duty cycle of the alternating potential difference.

11. The fluid treatment device of claim 10, wherein the peak voltage of the alternating potential difference is increased in response to a reduction in the conductivity between the first electrode and the second electrode.

12. The fluid treatment device of claim 10, wherein the duty cycle of the alternating potential difference is increased in response to a reduction in the conductivity between the first electrode and the second electrode.

13. The fluid treatment device of claim 10, wherein the threshold peak voltage corresponds to a target power to be applied to the water based fluid.

14. The fluid treatment device of claim 10, wherein a period of the alternating potential difference is adjusted by the control device to enhance resonance in the water based fluid.

15. The fluid treatment device of claim 14, wherein the period is adjusted by varying the period through a range of periods.

16. The fluid treatment device of claim 10, wherein the plurality of spaced apart tubular members of the second electrode are parallel to the plurality of spaced apart tubular members of the first electrode.

17. The fluid treatment device of claim 10, wherein the plurality of spaced apart tubular members of the first electrode each have a hollow interior space.

* * * * *